United States Patent
Hendry

(10) Patent No.: US 12,445,652 B2
(45) Date of Patent: Oct. 14, 2025

(54) METHOD AND DEVICE FOR GENERATING/RECEIVING MEDIA FILE INCLUDING OUTPUT LAYER SET INFORMATION, AND METHOD FOR TRANSMITTING MEDIA FILE

(71) Applicant: LG ELECTRONICS INC., Seoul (KR)

(72) Inventor: Hendry Hendry, Seoul (KR)

(73) Assignee: LG ELECTRONICS INC., Seoul (KR)

(*) Notice: Subject to any disclaimer, the term of this patent is extended or adjusted under 35 U.S.C. 154(b) by 260 days.

(21) Appl. No.: 18/025,593

(22) PCT Filed: Sep. 29, 2021

(86) PCT No.: PCT/KR2021/013347
§ 371 (c)(1),
(2) Date: Mar. 9, 2023

(87) PCT Pub. No.: WO2022/071754
PCT Pub. Date: Apr. 7, 2022

(65) Prior Publication Data
US 2023/0336783 A1    Oct. 19, 2023

Related U.S. Application Data

(60) Provisional application No. 63/087,287, filed on Oct. 4, 2020, provisional application No. 63/084,574, filed on Sep. 29, 2020.

(51) Int. Cl.
*H04N 19/70* (2014.01)
*H04N 19/169* (2014.01)
*H04N 19/30* (2014.01)

(52) U.S. Cl.
CPC ........... *H04N 19/70* (2014.11); *H04N 19/188* (2014.11); *H04N 19/30* (2014.11)

(58) Field of Classification Search
CPC ....... H04N 19/70; H04N 19/188; H04N 19/30
See application file for complete search history.

(56) References Cited

U.S. PATENT DOCUMENTS

| | | | |
|---|---|---|---|
| 10,237,564 | B1 | 3/2019 | Tsukuba et al. |
| 2017/0105027 | A1 | 4/2017 | Deshpande |

(Continued)

FOREIGN PATENT DOCUMENTS

| | | |
|---|---|---|
| CN | 107211168 A | 9/2017 |
| CN | 107750458 A | 3/2018 |

(Continued)

OTHER PUBLICATIONS

"Versitile video coding", Series H: Audiovisual and Multimedia Systems Infrastructure of audiovisual services—Coding of moving video. ITU-T H.266. Aug. 29, 2020.

*Primary Examiner* — Jae N Noh
(74) *Attorney, Agent, or Firm* — Bryan Cave Leighton Paisner LLP

(57) ABSTRACT

A media file generating/receiving method and apparatus for signaling operating point information and a method of transmitting a media file are provided. A media file receiving method comprises obtaining operating point information of video data from a media file and processing the video data based on the obtained operating point information. The obtaining the operating point information may comprise obtaining first information specifying a number of output layer sets for the video data, obtaining second information on the output layer sets based on the first information, obtaining third information specifying a number of operating points for the output layer sets, and obtaining fourth (Continued)

information on output layer sets associated with the operating points based on the third information.

16 Claims, 13 Drawing Sheets

(56) References Cited

U.S. PATENT DOCUMENTS

2022/0086496 A1* 3/2022 Wang .................. H04N 19/188
2022/0086499 A1* 3/2022 Wang .................. H04N 19/186

FOREIGN PATENT DOCUMENTS

| GB | 2599171 A | * | 3/2022 | ............. H04N 19/46 |
| KR | 1020180019557 A | | 2/2018 | |
| KR | 1020180068979 A | | 6/2018 | |

* cited by examiner

FIG. 9

```
Syntax class VvcOperatingPointsRecord {
      unsigned int(8) num_profile_tier_level_minus1;
      for (i=0; i<=num_profile_tier_level_minus1; i++) {
            unsigned int(8) ptl_max_temporal_id[i];
            VvcPTLRecord(ptl_max_temporal_id[i]+1) ptl[i];
      }
      unsigned int(1) all_independent_layers_flag;
      bit(7) reserved = 0;
      if (all_independent_layers_flag){
      unsigned int(1) each_layer_is_an_ols_flag;
            bit(7) reserved = 0;
      } else
            unsigned int(8) ols_mode_idc;
      unsigned int(16) num_operating_points;
      for (i=0; i<num_operating_points; i++) {
            unsigned int(16) output_layer_set_idx;
            unsigned int(8) ptl_idx;
            unsigned int(8) max_temporal_id;
            unsigned int(8) layer_count;
            for (j=0; j<layer_count; j++) {
                  unsigned int(6) layer_id;
                  unsigned int(1) is_outputlayer;
                  bit(1) reserved = 0;
            }
            bit(6) reserved = 0;
            unsigned int(1) frame_rate_info_flag
            unsigned int(1) bit_rate_info_flag
            if (frame_rate_info_flag) {
                  unsigned int(16) avgFrameRate;
                  bit(6) reserved = 0;
                  unsigned int(2) constantFrameRate;
            }
            if (bit_rate_info_flag) {
                  unsigned int(32) maxBitRate;
                  unsigned int(32) avgBitRate;
            }
      }
      unsigned int(8) max_layer_count;
      for (i=0; i<max_layer_count; i++) {
            unsigned int(8) layerID;
            unsigned int(8) num_direct_ref_layers;
            for (j=0; j<num_direct_ref_layers; j++)
                  unsigned int(8) direct_ref_layerID;
            unsigned int(8) max_tid_il_ref_pics_plus1;
      }
} class VvcOperatingPointsInformation extends VisualSampleGroupEntry ('vopi')
{
      VvcOperatingPointsRecord oinf;
}
```

FIG. 10

```
Syntax aligned(8) class OperatingPointGroupBox extends EntityToGroupBox('opeg',0,0)
{
        unsigned int(8) num_profile_tier_level_minus1;
        for (i=0; i<=num_profile_tier_level_minus1; i++)
                VvcPTLRecord(0) opeg_ptl[i];
        unsigned int(16) num_operating_points;
        for (i=0; i<num_operating_points; i++) {
                unsigned int(16) output_layer_set_idx;
                unsigned int(8) ptl_idx;
                unsigned int(8) max_temporal_id;
                unsigned int(8) layer_count;
                for (j=0; j<layer_count; j++) {
                        unsigned int(6) layer_id;
                        unsigned int(1) is_outputlayer;
                        bit(1) reserved = 0;
                }
                bit(6) reserved = 0;
                unsigned int(1) frame_rate_info_flag
                unsigned int(1) bit_rate_info_flag
                if (frame_rate_info_flag) {
                        unsigned int(16) avgFrameRate;
                        bit(6) reserved = 0;
                        unsigned int(2) constantFrameRate;
                }
                if (bit_rate_info_flag) {
                        unsigned int(32) maxBitRate;
                        unsigned int(32) avgBitRate;
                }
                unsigned int(8) entity_count;
                for (j=0; j<entity_count; j++) {
                        unsigned int(8) entity_idx;
                }
        }
}
```

FIG. 11

```
Syntax aligned(8) class VvcPTLRecord(num_sublayers) {
        unsigned int(8) num_bytes_constraint_info;
        unsigned int(7) general_profile_idc;
        unsigned int(1) general_tier_flag;
        unsigned int(8) general_level_idc;
        unsigned int(1) ptl_frame_only_constraint_flag;
        unsigned int(1) ptl_multilayer_enabled_flag;
        if (num_bytes_constraint_info > 0)
                unsigned int(8*num_bytes_constraint_info - 2) general_constraint_info;
        for (i=num_sublayers - 2; i >= 0; i--)
                unsigned int(1) ptl_sublayer_level_present_flag[i];
        for (j=num_sublayers; j<=8 && num_sublayers > 1; j++)
                bit(1) ptl_reserved_zero_bit = 0;
        for (i=num_sublayers-2; i >= 0; i--)
                if (ptl_sublayer_level_present[i])
                        unsigned int(8) sublayer_level_idc[i];
        unsigned int(8) num_sub_profiles;
        for (j=0; j < num_sub_profiles; j++)
                unsigned int(32) general_sub_profile_idc;
}
```

FIG. 12

```
Syntax class VvcOperatingPointsRecord {
    unsigned int(8) num_profile_tier_level_minus1;
    for (i=0; i<=num_profile_tier_level_minus1; i++) {
        unsigned int(8) ptl_max_temporal_id[i];
        VvcPTLRecord(ptl_max_temporal_id[i]+1) ptl[i];
    }
    unsigned int(9) num_olss;
    unsigned int(2) ols_mode_idc;
    unsigned int(1) sparse_layer_id_present_flag;
    bit(4) reserved = 0;
    for (i=0; i<num_olss; i++) {
        unsigned int(8) ptl_idx[i];
        if( ols_mode_idc == 2 ) {
            unsigned int(9) output_layer_set_idx[i];
            unsigned int(6) layer_count[i];
            bit(1) reserved = 0;
        }
        if( ols_mode_idc == 2 || sparse_layer_id_present_flag == 1 ) {
            for (j=0; j<layer_count; j++) {
                unsigned int(6) layer_id[i][j];
                unsigned int(1) is_output_layer[i][j];
                bit(1) reserved = 0;
            }
        }
    }
    unsigned int(16) num_operating_points;
    for (i=0; i<num_operating_points; i++) {
        bit(4) reserved = 0;
        unsigned int(9) ols_idx;
        unsigned int(3) max_temporal_id;
        bit(6) reserved = 0;
        unsigned int(1) frame_rate_info_flag;
        unsigned int(1) bit_rate_info_flag;
        if (frame_rate_info_flag) {
            unsigned int(16) avgFrameRate;
            bit(6) reserved = 0;
            unsigned int(2) constantFrameRate;
        }
        if (bit_rate_info_flag) {
            unsigned int(32) maxBitRate;
            unsigned int(32) avgBitRate;
        }
    }
    unsigned int(8) max_layer_count;
    for (i=0; i<max_layer_count; i++) {
        unsigned int(8) layerID;
        unsigned int(8) num_direct_ref_layers;
        for (j=0; j<num_direct_ref_layers; j++)
            unsigned int(8) direct_ref_layerID;
        unsigned int(8) max_tid_il_ref_pics_plus1;
    }
}
```

FIG. 13

```
Syntax aligned(8) class OperatingPointGroupBox
extends EntityToGroupBox('opeg',0,0)
{
        unsigned int(8) num_profile_tier_level_minus1;
        for (i=0; i<=num_profile_tier_level_minus1; i++)
                VvcPTLRecord(0) opeg_ptl[i];
        unsigned int(9) num_olss;
        unsigned int(2) ols_mode_idc;
        unsigned int(1) sparse_layer_id_present_flag;
        bit(4) reserved = 0;
        for (i=0; i<num_olss) {
                unsigned int(8) ptl_idx[i];
                if( ols_mode_idc == 2 ) {
                        unsigned int(9) output_layer_set_idx[i];
                        unsigned int(6) layer_count[i];
                        bit(1) reserved = 0;
                }
                if( ols_mode_idc == 2 || sparse_layer_id_present_flag == 1 ) {
                        for (j=0; j<layer_count; j++) {
                                unsigned int(6) layer_id[i][j];
                                unsigned int(1) is_output_layer[i][j];
                                bit(1) reserved = 0;
                        }
                }
        }
        unsigned int(16) num_operating_points;
        for (i=0; i<num_operating_points) {
                bit(4) reserved = 0;
                unsigned int(9) ols_idx;
                unsigned int(3) max_temporal_id;
                bit(6) reserved = 0;
                unsigned int(1) frame_rate_info_flag
                unsigned int(1) bit_rate_info_flag
                if (frame_rate_info_flag) {
                        unsigned int(16) avgFrameRate;
                        bit(6) reserved = 0;
                        unsigned int(2) constantFrameRate;
                }
                if (bit_rate_info_flag) {
                        unsigned int(32) maxBitRate;
                        unsigned int(32) avgBitRate;
                }
                unsigned int(8) entity_count;
                for (j=0; j<entity_count; j++) {
                        unsigned int(8) entity_idx;
                }
        }
}
```

METHOD AND DEVICE FOR GENERATING/RECEIVING MEDIA FILE INCLUDING OUTPUT LAYER SET INFORMATION, AND METHOD FOR TRANSMITTING MEDIA FILE

This application is a National Phase application under 35 U.S.C. 371 of International Application No. PCT/KR2021/013347, filed on Sep. 29, 2021, which claims the benefit of U.S. Provisional Application No. 63/084,574, filed on Sep. 29, 2020, and 63/087,287, filed Oct. 4, 2020, the contents of which are incorporated by reference herein in their entirety.

TECHNICAL FIELD

The present disclosure relates to a media file generating/receiving method and apparatus and, more particularly, to a method and apparatus for generating/receiving a media file including output layer set information and a method of transmitting a media file generated by the media file generating method/apparatus of the present disclosure.

BACKGROUND

Recently, the demand for high-resolution and high-quality images such as 360-degree images is increasing. As the resolution or quality of an image increases, a file capacity or a frame rate increases, which inevitably increases storage cost and transmission cost. In addition, as mobile devices such as smartphones and tablet PCs become popular, the demand for multimedia services based on communication networks is rapidly increasing. However, there is a problem that hardware and network resources for multimedia services are limited.

Accordingly, there is a need for high-efficiency image compression and file processing technologies for more effectively storing and transmitting image data.

SUMMARY

An object of the present disclosure is to provide a media file generating/receiving method and apparatus with improved file processing efficiency.

Also, an object of the present disclosure is to provide a media file generating/receiving method and apparatus capable of preventing redundancy of output layer set information and improving file transmission/reception efficiency.

Also, an object of the present disclosure is to provide a method of transmitting a media file generated by a media file generating method or apparatus according to the present disclosure.

Also, an object of the present disclosure is to provide a recoding medium storing a media file generated by a media file generating method or apparatus according to the present disclosure.

Also, an object of the present disclosure is to provide a recording medium storing a media file received by a media file receiving apparatus according to the present disclosure and used to reconstruct an image.

The technical problems solved by the present disclosure are not limited to the above technical problems and other technical problems which are not described herein will become apparent to those skilled in the art from the following description.

A media file receiving method according to an aspect of the present disclosure may comprise obtaining operating point information of video data from a media file and processing the video data based on the obtained operating point information. The obtaining the operating point information may comprise obtaining first information specifying a number of output layer sets for the video data, obtaining second information on the output layer sets based on the first information, obtaining third information specifying a number of operating points for the output layer sets, and obtaining fourth information on output layer sets associated with the operating points based on the third information.

A media file receiving apparatus according to another aspect of the present disclosure may comprise a memory and at least one processor. The at least one processor may obtain operating point information of video data from a media file and process the video data based on the obtained operating point information. The operating point information may be obtained by obtaining first information specifying a number of output layer sets for the video data, obtaining second information on the output layer sets based on the first information, obtaining third information specifying a number of operating points for the output layer sets and obtaining fourth information on output layer sets associated with the operating points based on the third information.

A media file generating method according to another aspect of the present disclosure may comprise encoding video data, generating operating point information for the encoded video data, and generating a media file based on the encoded video data and the generated operating point information. The generating the operating point information may comprise generating first information specifying a number of output layer sets for the encoded video data, generating second information on the output layer sets based on the first information, generating third information specifying a number of operating points for the output layer sets, and generating fourth information on output layer sets associated with the operating points based on the third information.

In a media file transmitting method according to another aspect of the present disclosure, a media file generated by the media file generating method or apparatus of the present disclosure may be transmitted.

A computer-readable recording medium according to another aspect of the present disclosure may store a media file generated by the media file generating method or apparatus of the present disclosure.

A media file generating apparatus according to another aspect of the present disclosure may comprise a memory and at least one processor. The at least one processor may encode video data, generate operating point information of the encoded video data and generate a media file based on the encoded video data and the generated operating point information. The operating point information may be generated by obtaining first information specifying the number of output layer sets for the encoded video data, obtaining second information of the output layer sets based on the first information, obtaining third information specifying the number of operating points for the output layer sets and obtaining fourth information of output layer sets associated with the operating points based on the third information.

The features briefly summarized above with respect to the present disclosure are merely exemplary aspects of the detailed description below of the present disclosure, and do not limit the scope of the present disclosure.

According to the present disclosure, it is possible to provide a media file generating/receiving method and apparatus with improved file processing efficiency.

According to the present disclosure, it is possible to provide a media file generating/receiving method and apparatus capable of preventing redundancy of output layer set information and improving file transmission/reception efficiency.

According to the present disclosure, it is possible to provide a method of transmitting a media file generated by a media file generating method or apparatus according to the present disclosure.

According to the present disclosure, it is possible to provide a recoding medium storing a media file generated by a media file generating method or apparatus according to the present disclosure.

According to the present disclosure, it is possible to provide a recording medium storing a media file received by a media file receiving apparatus according to the present disclosure and used to reconstruct an image.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 9 is a diagram illustrating an example of a syntax structure VvcOperatingPointsRecord signaling operating point information.

FIG. 10 is a diagram illustrating an example of a syntax structure OperatingPointGroupBox signaling an operating point entity group.

FIG. 11 is a diagram illustrating an example of a syntax structure VvcPTLRecord signaling a PTL record.

FIG. 12 is a diagram illustrating a syntax structure VvcOperatingPointsRecord signaling operating point information according to an embodiment of the present disclosure.

FIG. 13 is a diagram illustrating a syntax structure OperatingPointGroupBox signaling an operating point entity group according to an embodiment of the present disclosure.

DETAILED DESCRIPTION

Figure 1:
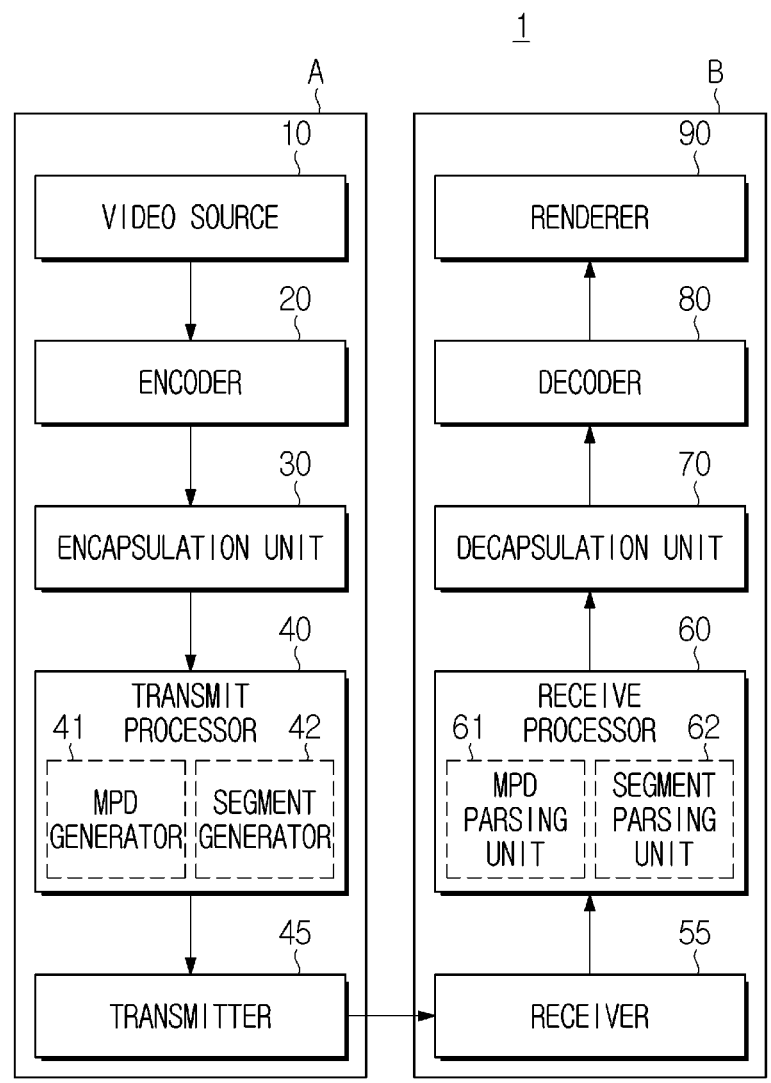
FIG. 1 is a view schematically illustrating a media file transmitting/receiving system according to an embodiment of the present disclosure.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile is a coding unit constituting a part of a picture, and one picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean a block including both a luma component block and a chroma component block or "a luma block of a current block" unless explicitly stated as a chroma block. The luma component block of the current block may be expressed by including an explicit description of a luma component block such as "luma block" or "current luma block. In addition, the "chroma component block of the current block" may be expressed by including an explicit description of a chroma component block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Media File Transmitting/Receiving System

FIG. 1 is a view schematically illustrating a media file transmitting/receiving system according to an embodiment of the present disclosure.

Referring to FIG. 1, the media file transmitting/receiving system 1 may include a transmitting apparatus A and a receiving apparatus B. In some embodiments, the media file transmitting/receiving system 1 may support adaptive streaming based on MPEG-DASH (dynamic adaptive streaming over HTTP), thereby supporting seamless media content reproduction.

The transmitting apparatus A may include a video source 10, an encoder 20, an encapsulation unit 30, a transmit processor 40 and a transmitter 45.

The video source 10 may generate or obtain media data such as video or image. To this end, the video source 10 may include a video/image capture device and/or a video/image generating device or may be connected to an external device to receive media data.

The encoder 20 may encode media data received from the video source 10. The encoder 20 may perform a series of procedures such as prediction, transform, and quantization according to a video codec standard, for example, a Versatile Video Coding (VVC) standard, for compression and encoding efficiency. The encoder 20 may output the encoded media data in the form of a bitstream.

The encapsulation unit 30 may encapsulate the encoded media data and/or media data related metadata. For example, the encapsulation unit 30 may encapsulate the data in a file format such as ISO Base Media File Format (ISO BMFF) or Common Media Application Format (CMAF), or process the data in the form of segments. Media data (hereinafter, referred to as a 'media file') encapsulated in the form of a file may be stored in a storage unit (not shown) in some embodiments. The media file stored in the storage unit may be read by the transmit processor 40 and transmitted to the receiving apparatus B according to an on demand, Non-Real Time (NRT) or broadband method.

The transmit processor 40 may generate an image signal by processing the media file according to an arbitrary transmitting method. The media file transmitting method may include a broadcast method and a broadband method.

According to the broadcast method, the media file may be transmitted using an MPEG Media Transport (MMT) protocol or a Real time Object delivery over Unidirectional Transport (ROUTE) protocol. The MMT protocol may be a transport protocol supporting media streaming regardless of a file format or codec in an IP-based network environment. In the case of using the MMT protocol, the media file may be processed in Media Processing Units (MPUs) based on MMT and then transmitted according to the MMT protocol. The ROUTE protocol is an extension of File Delivery over Unidirectional Transport (FLUTE), and may be a transport protocol supporting real-time transmission of media files. In the case of using the ROUTE protocol, the media file may be processed into one or more segments based on MPEG-DASH and then transmitted according to the ROUTE protocol.

According to the broadband method, the media file may be transmitted through a network using HTTP (HyperText Transfer Protocol). Information transmitted through HTTP may include signaling metadata, segment information, and/or Non-Real Time (NRT) service information.

In some embodiments, the transmit processor 40 may include an MPD generator 41 and a segment generator 42 to support adaptive media streaming.

The MPD generator 41 may generate a Media Presentation Description (MPD) based on the media file. The MPD is a file including detailed information on media presentation, and may be expressed in an XML format. The MPD may provide signaling metadata, such as an identifier for each segment. In this case, the receiving apparatus B may dynamically obtain segments based on the MPD.

The segment generator 42 may generate one or more segments based on the media file. The segment may include actual media data and may have a file format such as ISO BMFF. The segment may be included in the representation of an image signal, and, as described above, may be identified based on the MPD.

In addition, the transmit processor 40 may generate an image signal according to the MPEG-DASH standard based on the generated MPD and segment.

The transmitter 45 may transmit the generated image signal to the receiving apparatus B. In some embodiments, the transmitter 45 may transmit an image signal to the receiving apparatus B through an IP network according to the MMT standard or the MPEG-DASH standard. According to the MMT standard, the image signal transmitted to the receiving apparatus B may include a presentation information document (PI) including reproduction information of the media data. According to the MPEG-DASH standard, the image signal transmitted to the receiving apparatus B may include the aforementioned MPD as reproduction information of the media data. However, in some embodiments, the MPD and the segment may be individually transmitted to the receiving apparatus B. For example, a first image signal including the MPD may be generated by the transmitting apparatus A or an external server and transmitted to the receiving apparatus B, and a second image signal including the segment may be generated by the transmitting apparatus A and may be transmitted to the receiving apparatus B.

Meanwhile, although the transmit processor 40 and the transmitter 45 are illustrated as separate elements in FIG. 1, they may be integrally implemented as a single element in some embodiments. Also, the transmit processor 40 may be implemented as an external device (e.g., DASH server) separate from the transmitting apparatus A. In this case, the transmitting apparatus A may operate as a source apparatus generating a media file by encoding the media data, and the external apparatus may operate as a server apparatus generating an image signal by processing the media data according to an arbitrary transmission protocol.

Next, the receiving apparatus B may include a receiver 55, a receive processor 60, a decapsulation unit 70, a decoder 80, and a renderer 90. In some embodiments, the receiving apparatus B may be an MPEG-DASH-based client.

The receiver 55 may receive an image signal from the transmitting apparatus A. The image signal according to the MMT standard may include a PI document and a media file. In addition, the image signal according to the MPEG-DASH standard may include an MPD and a segment. In some embodiments, the MPD and the segment may be separately transmitted through different image signals.

The receive processor 60 may extract/parse a media file by processing the received image signal according to a transport protocol.

In some embodiments, the receive processor 60 may include an MPD parsing unit 61 and a segment parsing unit 62 in order to support adaptive media streaming.

The MPD parsing unit 61 may obtain an MPD from the received image signal, and parse the obtained MPD to generate a command required for obtaining a segment. Also, the MPD parsing unit 61 may obtain media data reproduction information, for example, color conversion information, based on the parsed MPD.

The segment parsing unit 62 may obtain a segment based on the parsed MPD and parse the obtained segment to extract the media file. In some embodiments, the media file may have a file format such as ISO BMFF or CMAF.

The decapsulation unit 70 may decapsulate the extracted media file to obtain media data and metadata related thereto. The obtained metadata may have the form of a box or track in a file format. In some embodiments, the decapsulation unit 70 may receive metadata required for decapsulation from the MPD parsing unit 61.

The decoder 80 may decode the obtained media data according to a video codec standard, for example, a VVC standard. To this end, the decoder 80 may perform a series of procedures such as inverse quantization, inverse transform, and prediction corresponding to operation of the encoder 20.

The renderer 90 may render media data such as the decoded video or image. The rendered media data may be reproduced through a display unit (not shown).

Hereinafter, a media file transmitting/receiving method will be described in detail.

Figure 2:
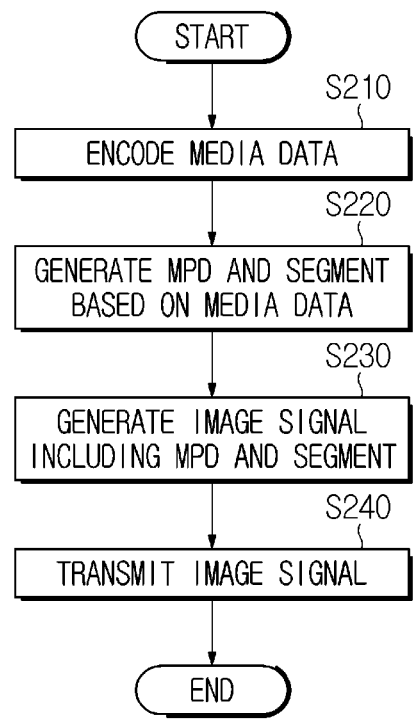
FIG. 2 is a flowchart illustrating a media file transmitting method.

FIG. 2 is a flowchart illustrating a media file transmitting method.

In one example, each step of FIG. 2 may be performed by the transmitting apparatus A of FIG. 1. Specifically, step S210 may be performed by the encoder 20 of FIG. 1. Also, steps S220 and S230 may be performed by the transmit processor 40. Also, step S240 may be performed by the transmitter 45.

Referring to FIG. 2, the transmitting apparatus may encode media data such as a video or an image (S210). The media data may be captured/generated by the transmitting apparatus or obtained from an external device (e.g., camera, video archive, etc.). Media data may be encoded in the form of a bitstream according to a video codec standard, for example, a VVC standard.

The transmitting apparatus may generate an MPD and one or more segments based on the encoded media data (S220). The MPD may include detailed information about media presentation as described above. The segment may contain actual media data. In some embodiments, the media data may be encapsulated in a file format such as ISO BMFF or CMAF and included in a segment.

The transmitting apparatus may generate an image signal including the generated MPD and segment (S230). In some embodiments, the image signal may be individually generated for each of the MPD and segment. For example, the transmitting apparatus may generate a first image signal including an MPD and generate a second image signal including a segment.

The transmitting apparatus may transmit the generated image signal to the receiving apparatus (S240). In some embodiments, the transmitting apparatus may transmit the image signal using a broadcast method. In this case, the MMT protocol or the ROUTE protocol may be used. Alternatively, the transmitting apparatus may transmit the image signal using a broadband method.

Meanwhile, although, in FIG. 2, the MPD and an image signal including the same are described as being generated and transmitted by the transmitting apparatus (steps S220 to S240), in some embodiments, the MPD and an image including the same may be generated and transmitted by an external server different from the transmitting apparatus.

Figure 3:
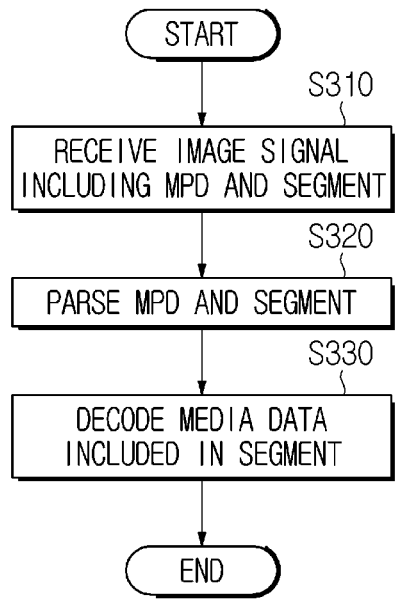
FIG. 3 is a flowchart illustrating a media file receiving method.

FIG. 3 is a flowchart illustrating a media file receiving method.

In an example, each step of FIG. 3 may be performed by the receiving apparatus B of FIG. 1. Specifically, step S310 may be performed by the receiver 55. Also, step S320 may be performed by the receive processor 60. Also, step S330 may be performed by the decoder 80.

Referring to FIG. 3, the receiving apparatus may receive an image signal from the transmitting apparatus (S310). An image signal according to the MPEG-DASH standard may include an MPD and a segment. In some embodiments, the MPD and the segment may be individually received through different image signals. For example, a first image signal including the MPD may be received from the transmitting apparatus of FIG. 1 or an external server, and a second image signal including the segment may be received from the transmitting apparatus of FIG. 1.

The receiving apparatus may extract the MPD and segment from the received image signal, and parse the extracted MPD and segment (S320). Specifically, the receiving apparatus may parse the MPD to generate a command required for obtaining a segment. Then, the receiving apparatus may obtain a segment based on the parsed MPD, and parse the obtained segment to obtain media data. In some embodiments, the receiving apparatus may perform decapsulation on media data in a file format in order to obtain the media data from the segment.

The receiving apparatus may decode the media data such as the obtained video or image (S330). The receiving apparatus may perform a series of procedures such as inverse quantization, inverse transform, and prediction in order to decode the media data. Then, the receiving apparatus may render the decoded media data and reproduce the media data through a display.

Hereinafter, an image encoding/decoding apparatus will be described in detail.

Overview of Image Encoding Apparatus

Figure 4:
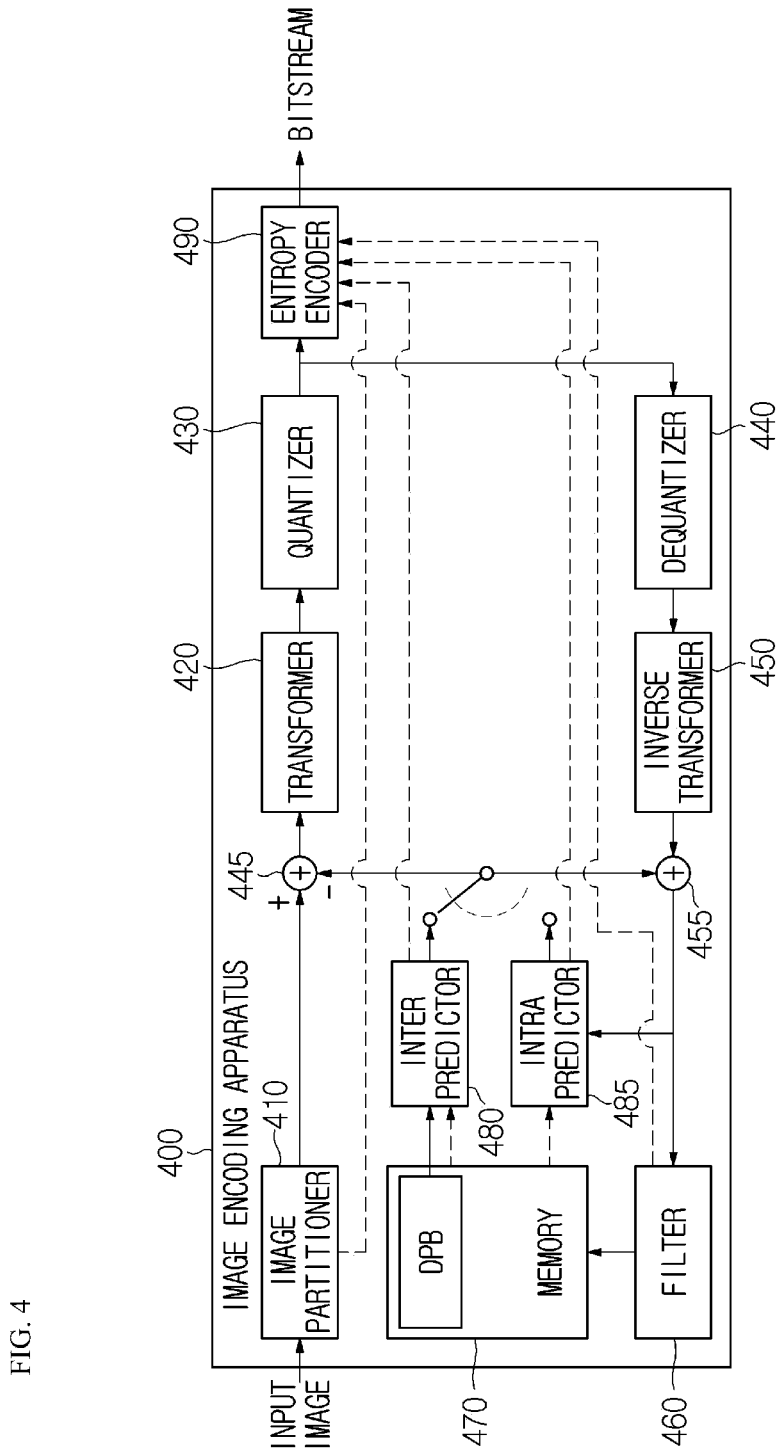
FIG. 4 is a view schematically illustrating an image encoding apparatus according to an embodiment of the present disclosure.

FIG. 4 is a view schematically illustrating an image encoding apparatus according to an embodiment of the present disclosure. The image encoding apparatus 400 of FIG. 4 may correspond to the encoder 20 of the transmitting apparatus A described with reference to FIG. 1.

Referring to FIG. 4, the image encoding apparatus 400 may include an image partitioner 410, a subtractor 415, a transformer 420, a quantizer 430, a dequantizer 440, an inverse transformer 450, an adder 455, a filter 460, a memory 470, an inter prediction unit 480, an intra prediction unit 485 and an entropy encoder 490. The inter prediction unit 480 and the intra prediction unit 485 may be collectively referred to as a "predictor". The transformer 420, the quantizer 430, the dequantizer 440 and the inverse transformer 450 may be included in a residual processor. The residual processor may further include the subtractor 415.

All or at least some of the plurality of components configuring the image encoding apparatus 400 may be configured by one hardware component (e.g., an encoder or a processor) in some embodiments. In addition, the memory 470 may include a decoded picture buffer (DPB) and may be configured by a digital storage medium.

The image partitioner 410 may partition an input image (or a picture or a frame) input to the image encoding apparatus 400 into one or more processing units. For example, the processing unit may be called a coding unit (CU). The coding unit may be obtained by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth obtained by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 480 or the intra prediction unit 485) may perform prediction on a block to be processed (current block) and generate a predicted block including prediction samples for the current block.

The prediction unit may determine whether intra prediction or inter prediction is applied on a current block or CU unit. The prediction unit may generate various information related to prediction of the current block and transmit the generated information to the entropy encoder 490. The information on the prediction may be encoded in the entropy encoder 490 and output in the form of a bitstream.

The intra prediction unit 485 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 485 may determine the prediction mode applied to the current block by using a prediction mode applied to a neighboring block.

The inter prediction unit 480 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 480 may configure a motion information candidate list based on neighboring blocks and generate information specifying which candidate is used to derive a motion vector and/or a reference picture index of the current block. Inter prediction may be performed based on various prediction modes. For example, in the case of a skip mode and a merge mode, the inter prediction unit 480 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 415 may generate a residual signal (residual block or residual sample array) by subtracting the prediction signal (predicted block or prediction sample array) output from the prediction unit from the input image signal (original block or original sample array). The generated residual signal may be transmitted to the transformer 420.

The transformer 420 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform obtained based on a prediction signal generated using all previously reconstructed pixels. In addition, the transform process may be applied to square pixel blocks having the same size or may be applied to blocks having a variable size rather than square.

The quantizer 430 may quantize the transform coefficients and transmit them to the entropy encoder 490. The entropy encoder 490 may encode the quantized signal (information on the quantized transform coefficients) and output a bitstream. The information on the quantized transform coefficients may be referred to as residual information. The quantizer 430 may rearrange quantized transform coefficients in a block type into a one-dimensional vector form based on a coefficient scanning order and generate information on the quantized transform coefficients based on the quantized transform coefficients in the one-dimensional vector form.

The entropy encoder 490 may perform various encoding methods such as, for example, exponential Golomb, context-adaptive variable length coding (CAVLC), context-adaptive binary arithmetic coding (CABAC), and the like. The entropy encoder 490 may encode information required for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 490 and/or a storage unit (not shown) storing the signal may be included as internal/external element of the image encoding apparatus 400. Alternatively, the transmitter may be provided as the component of the entropy encoder 490.

The quantized transform coefficients output from the quantizer 430 may be used to generate a residual signal. For example, the residual signal (residual block or residual samples) may be reconstructed by applying dequantization and inverse transform to the quantized transform coefficients through the dequantizer 440 and the inverse transformer 450.

The adder 455 adds the reconstructed residual signal to the prediction signal output from the inter prediction unit 480 or the intra prediction unit 485 to generate a reconstructed signal (reconstructed picture, reconstructed block, reconstructed sample array). If there is no residual for the block to be processed, such as a case where the skip mode is applied, the predicted block may be used as the reconstructed block. The adder 455 may be called a reconstructor or a reconstructed block generator. The generated reconstructed signal may be used for intra prediction of a next block to be processed in the current picture and may be used for inter prediction of a next picture through filtering as described below.

Meanwhile, in a picture encoding and/or reconstruction process, luma mapping with chroma scaling (LMCS) is applicable.

The filter 460 may improve subjective/objective image quality by applying filtering to the reconstructed signal. For example, the filter 460 may generate a modified reconstructed picture by applying various filtering methods to the reconstructed picture and store the modified reconstructed picture in the memory 470, specifically, a DPB of the memory 470. The various filtering methods may include, for example, deblocking filtering, a sample adaptive offset, an adaptive loop filter, a bilateral filter, and the like. The filter 460 may generate various information related to filtering and transmit the generated information to the entropy encoder 490 as described later in the description of each filtering method. The information related to filtering may be encoded by the entropy encoder 490 and output in the form of a bitstream.

The modified reconstructed picture transmitted to the memory 470 may be used as the reference picture in the inter prediction unit 480. When inter prediction is applied through the image encoding apparatus 400, prediction mismatch between the image encoding apparatus 400 and the image decoding apparatus may be avoided and encoding efficiency may be improved.

The DPB of the memory 470 may store the modified reconstructed picture for use as a reference picture in the inter prediction unit 480. The memory 470 may store the motion information of the block from which the motion information in the current picture is derived (or encoded) and/or the motion information of the blocks in the picture that have already been reconstructed. The stored motion information may be transmitted to the inter prediction unit 480 and used as the motion information of the spatial neighboring block or the motion information of the temporal neighboring block. The memory 470 may store reconstructed samples of reconstructed blocks in the current picture and may transfer the reconstructed samples to the intra prediction unit 485.

Overview of Image Decoding Apparatus

Figure 5:
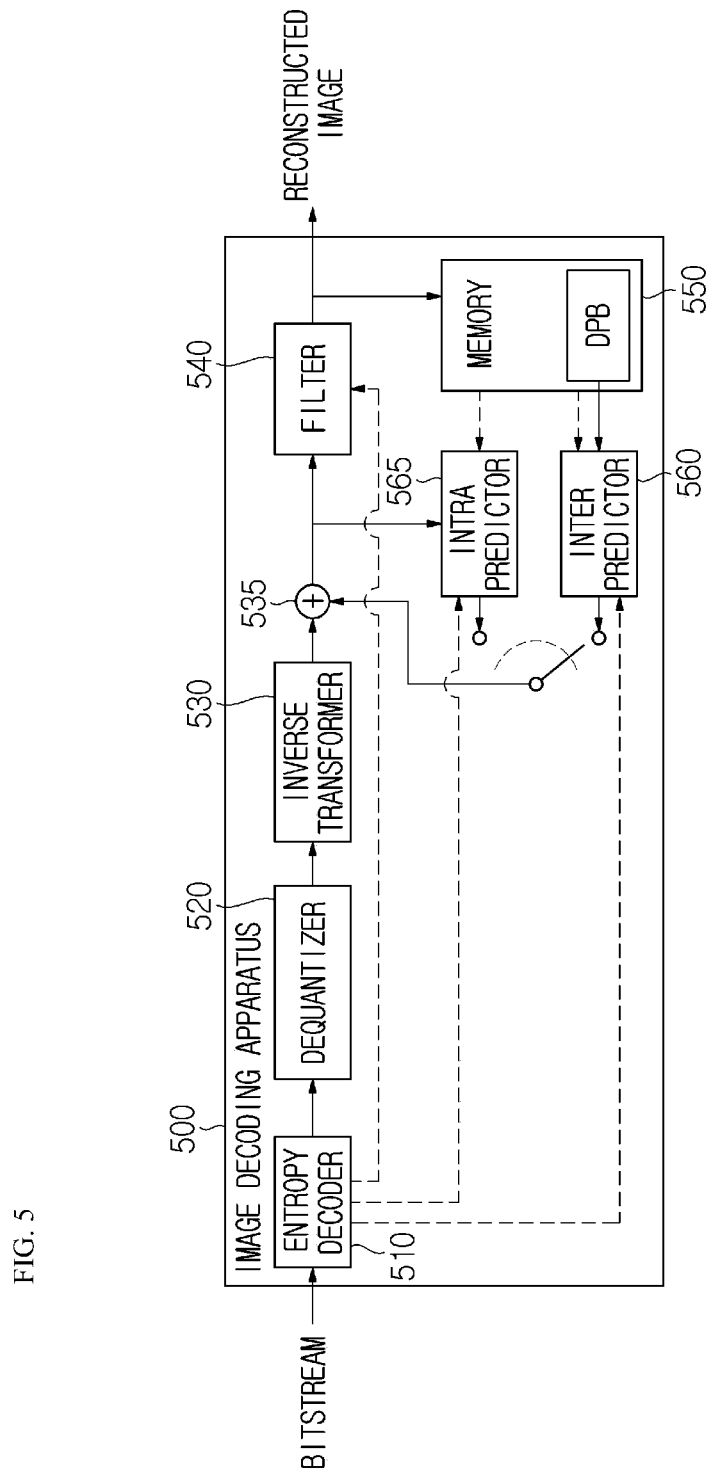
FIG. 5 is a view schematically illustrating an image decoding apparatus according to an embodiment of the present disclosure.

FIG. 5 is a view schematically illustrating an image decoding apparatus according to an embodiment of the present disclosure. The image decoding apparatus 500 of FIG. 5 may correspond to the decoder 80 of the receiving apparatus A described with reference to FIG. 1.

Referring to FIG. 5, the image decoding apparatus 500 may include an entropy decoder 510, a dequantizer 520, an inverse transformer 530, an adder 535, a filter 540, a memory 550, an inter prediction unit 560 and an intra prediction unit 565. The inter prediction unit 560 and the intra prediction unit 565 may be collectively referred to as a "predictor". The dequantizer 520 and the inverse transformer 530 may be included in a residual processor.

All or at least some of a plurality of components configuring the image decoding apparatus 500 may be configured by a hardware component (e.g., a decoder or a processor) according to an embodiment. In addition, the memory 550 may include a decoded picture buffer (DPB) or may be configured by a digital storage medium.

The image decoding apparatus 500, which has received a bitstream including video/image information, may reconstruct an image by performing a process corresponding to a process performed by the image encoding apparatus 100 of FIG. 4. For example, the image decoding apparatus 500 may perform decoding using a processing unit applied in the image encoding apparatus. Thus, the processing unit of decoding may be a coding unit, for example. The coding unit may be obtained by partitioning a coding tree unit or a largest coding unit. The reconstructed image signal decoded and output through the image decoding apparatus 500 may be reproduced through a reproducing apparatus (not shown).

The image decoding apparatus 500 may receive a signal generated by the image encoding apparatus of FIG. 4 in the form of a bitstream. The received signal may be decoded through the entropy decoder 510. For example, the entropy decoder 510 may parse the bitstream to derive information (e.g., video/image information) required for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 510 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 510 may be provided to the prediction unit (the inter prediction unit 560 and the intra prediction unit 565), and the residual value on which the entropy decoding was performed in the entropy decoder 510, that is, the quantized transform coefficients and related parameter information, may be input to the dequantizer 520. In addition, information on filtering among information decoded by the entropy decoder 510 may be provided to the filter 540. Meanwhile, a receiver (not shown) for receiving a signal output from the image encoding apparatus may be further configured as an internal/external element of the image decoding apparatus 500, or the receiver may be a component of the entropy decoder 510.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 510. The sample decoder may include at least one of the dequantizer 520, the inverse transformer 530, the adder 535, the filter 540, the memory 550, the inter prediction unit 560 or the intra prediction unit 565.

The dequantizer 520 may dequantize the quantized transform coefficients and output the transform coefficients. The dequantizer 520 may rearrange the quantized transform coefficients in the form of a two-dimensional block. In this case, the rearrangement may be performed based on the coefficient scanning order performed in the image encoding apparatus. The dequantizer 520 may perform dequantization on the quantized transform coefficients by using a quantization parameter (e.g., quantization step size information) and obtain transform coefficients.

The inverse transformer 530 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 510 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 565 may predict the current block by referring to the samples in the current picture. The description of the intra prediction unit 485 is equally applied to the intra prediction unit 565.

The inter prediction unit 560 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 560 may configure a motion information candidate list based on neighboring blocks and derive a motion vector of the current block and/or a reference picture index based on the received candidate selection information. Inter prediction may be performed based on various prediction modes, and the information on the prediction may include information specifying a mode of inter prediction for the current block.

The adder 535 may generate a reconstructed signal (reconstructed picture, reconstructed block, reconstructed sample array) by adding the obtained residual signal to the prediction signal (predicted block, predicted sample array) output from the prediction unit (including the inter prediction unit 560 and/or the intra prediction unit 565). If there is no residual for the block to be processed, such as when the skip mode is applied, the predicted block may be used as the reconstructed block. The description of the adder 155 is equally applicable to the adder 535. The adder 535 may be called a reconstructor or a reconstructed block generator. The generated reconstructed signal may be used for intra prediction of a next block to be processed in the current picture and may be used for inter prediction of a next picture through filtering as described below.

Meanwhile, in a picture decoding process, luma mapping with chroma scaling (LMCS) is applicable.

The filter 540 may improve subjective/objective image quality by applying filtering to the reconstructed signal. For example, the filter 540 may generate a modified reconstructed picture by applying various filtering methods to the reconstructed picture and store the modified reconstructed picture in the memory 550, specifically, a DPB of the memory 550. The various filtering methods may include, for example, deblocking filtering, a sample adaptive offset, an adaptive loop filter, a bilateral filter, and the like.

The (modified) reconstructed picture stored in the DPB of the memory 550 may be used as a reference picture in the inter prediction unit 560. The memory 550 may store the motion information of the block from which the motion information in the current picture is derived (or decoded) and/or the motion information of the blocks in the picture that have already been reconstructed. The stored motion information may be transmitted to the inter prediction unit 560 so as to be utilized as the motion information of the spatial neighboring block or the motion information of the temporal neighboring block. The memory 550 may store reconstructed samples of reconstructed blocks in the current picture and transfer the reconstructed samples to the intra prediction unit 565.

In the present disclosure, the embodiments described in the filter 460, the inter prediction unit 480, and the intra prediction unit 485 of the image encoding apparatus 400 may be equally or correspondingly applied to the filter 540, the inter prediction unit 560, and the intra prediction unit 565 of the image decoding apparatus 500.

The quantizer of the encoding apparatus may derive quantized transform coefficients by applying quantization to transform coefficients, and the dequantizer of the encoding apparatus or the dequantizer of the decoding apparatus ma derive transform coefficients by applying dequantization to the quantized transform coefficients. In video coding, a quantization rate may be changed and a compression rate may be adjusted using the changed quantization rate. From an implementation point of view, in consideration of complexity, a quantization parameter (QP) may be used instead of directly using the quantization rate. For example, a quantization parameter having an integer value of 0 to 63 may be used and each quantization parameter value may correspond to an actual quantization rate. In addition, a quantization parameter $QP_Y$ for a luma component (luma sample) and a quantization parameter $QP_C$ for a chroma component (chroma sample) may be differently set.

In a quantization process, a transform coefficient C may be received as input and divided by quantization rate $Q_{step}$, and a quantized transform coefficient C' may be derived based on this. In this case, in consideration of computational complexity, the quantization rate is multiplied by a scale to form an integer and shift operation may be performed by a value corresponding to the scale value. Based on the product of the quantization rate and the scale value, a quantization scale may be derived. That is, the quantization scale may be derived according to QP. In this case, by applying the quantization scale to the transform coefficient C, the quantized transform coefficient C' may be derived based on this.

A dequantization process is an inverse process of the quantization process, and the quantized transform coefficient C' may be multiplied by the quantization rate $Q_{step}$, thereby deriving a reconstructed transform coefficient C" based on this. In this case, a level scale may be derived according to the quantization parameter, the level scale may be applied to the quantized transform coefficient C', thereby deriving the reconstructed transform coefficient C" based on this. The reconstructed transform coefficient C" may be slightly different from the original transform coefficient C due to loss in the transform and/or quantization process. Accordingly, even the encoding apparatus may perform dequantization in the same manner as the decoding apparatus.

Meanwhile, adaptive frequency weighting quantization technology of adjusting a quantization strength according to frequency may be applied. The adaptive frequency weighting quantization technology may correspond to a method of differently applying a quantization strength according to the frequency. In adaptive frequency weighting quantization, the quantization strength may differently be applied according to the frequency using a predefined quantization scaling matrix. That is, the above-described quantization/dequantization process may be performed further based on the quantization scaling matrix.

For example, a different quantization scaling matrix may be used according to a size of a current block and/or whether a prediction mode applied to the current block in order to generate a residual signal of the current block is inter prediction or intra prediction. The quantization scaling matrix may also be referred to as a quantization matrix or a scaling matrix. The quantization scaling matrix may be predefined. In addition, frequency quantization scale information for the quantization scaling matrix for frequency adaptive scaling may be constructed/encoded by the encoding apparatus and signaled to the decoding apparatus. The frequency quantization scale information may be referred to as quantization scaling information. The frequency quantization scale information may include scaling list data scaling_list_data.

Based on the scaling list data, the quantization scaling matrix may be derived. In addition, the frequency quantization scale information may include present flag information specifying whether the scaling list data is present. Alternatively, when the scaling list data is signaled at a higher level (e.g., SPS), information specifying whether the scaling list data is modified at a lower level (e.g., PPS or tile group header, etc.) may be further included.

Figure 6:
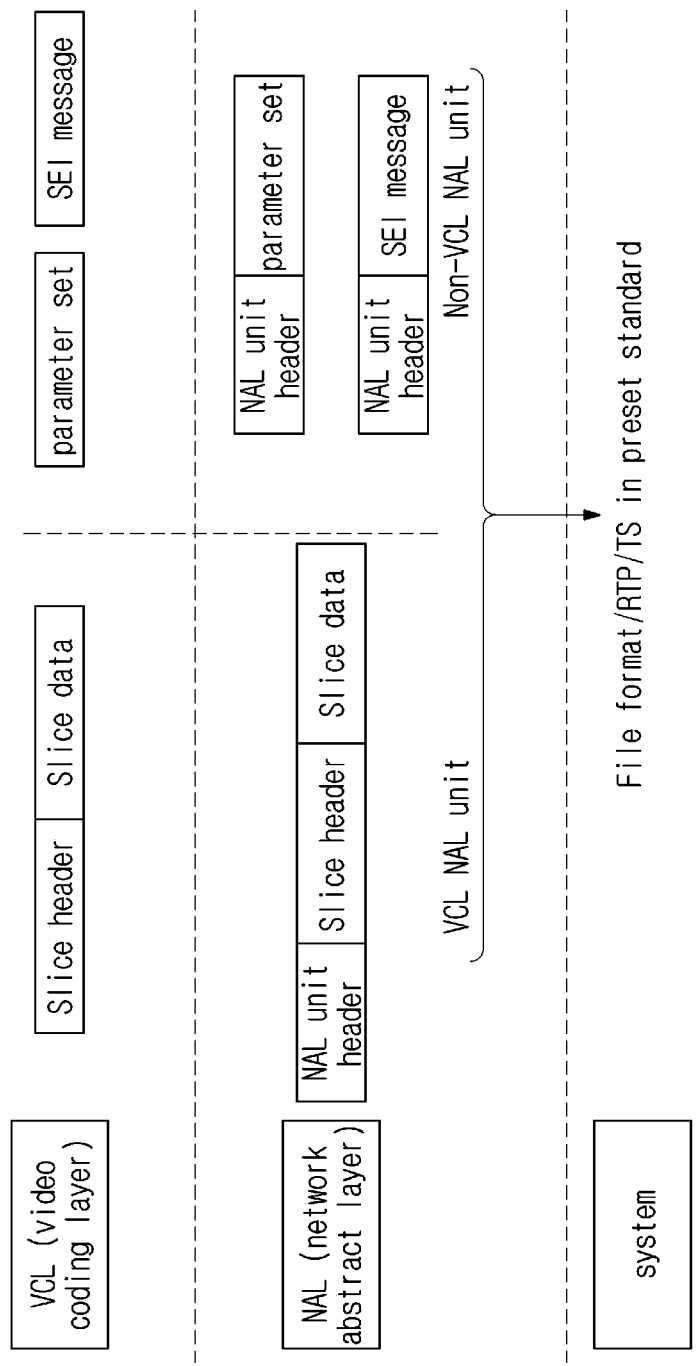
FIG. 6 is a view illustrating an example of a layer structure for a coded image/video.

FIG. 6 is a view illustrating an example of a layer structure for a coded image/video.

The coded image/video is classified into a video coding layer (VCL) for an image/video decoding process and handling itself, a lower system for transmitting and storing encoded information, and a network abstraction layer (NAL) present between the VCL and the lower system and responsible for a network adaptation function.

In the VCL, VCL data including compressed image data (slice data) may be generated or a supplemental enhancement information (SEI) message additionally required for a decoding process of an image or a parameter set including information such as a picture parameter set (PPS), a sequence parameter set (SPS) or a video parameter set (VPS) may be generated.

In the NAL, header information (NAL unit header) may be added to a raw byte sequence payload (RBSP) generated in the VCL to generate a NAL unit. In this case, the RBSP refers to slice data, a parameter set, an SEI message generated in the VCL. The NAL unit header may include NAL unit type information specified according to RBSP data included in a corresponding NAL unit.

As shown in FIG. 6, the NAL unit may be classified into a VCL NAL unit and a non-VCL NAL unit according to the type of the RBSP generated in the VCL. The VCL NAL unit may mean a NAL unit including information on an image (slice data), and the Non-VCL NAL unit may mean a NAL unit including information (parameter set or SEI message) required to decode an image.

The VCL NAL unit and the Non-VCL NAL unit may be attached with header information and transmitted through a network according to the data standard of the lower system. For example, the NAL unit may be modified into a data format of a predetermined standard, such as H.266/VVC file format, RTP (Real-time Transport Protocol) or TS (Transport Stream), and transmitted through various networks.

As described above, in the NAL unit, a NAL unit type may be specified according to the RBSP data structure included in the corresponding NAL unit, and information on the NAL unit type may be stored in a NAL unit header and signaled. For example, this may be largely classified into a VCL NAL unit type and a non-VCL NAL unit type depending on whether the NAL unit includes image information (slice data). The VCL NAL unit type may be classified according to the property/type of the picture included in the VCL NAL unit, and the Non-VCL NAL unit type may be classified according to the type of a parameter set.

The following lists examples of NAL unit types specified according to the type of parameter set/information included in the Non-VCL NAL unit type.

DCI (Decoding capability information) NAL unit type (NUT): type for NAL unit including DCI VPS (Video Parameter Set) NUT: type for NAL unit including VPS SPS(Sequence Parameter Set) NUT: type for NAL unit including SPS PPS (Picture Parameter Set) NUT: type for NAL unit including PPS APS (Adaptation Parameter Set) NUT: type for NAL unit including APS PH (Picture header) NUT: type for NAL unit including picture header The above-described NAL unit types have syntax information for the NAL unit type, and the syntax information may be stored in a NAL unit header and signaled. For example, the syntax information may be nal_unit_type, and NAL unit types may be specified using a nal_unit_type value.

Meanwhile, one picture may include a plurality of slices, and one slice may include a slice header and slice data. In this case, one picture header may be further added to a plurality of slices (slice header and slice data set) in one picture. The picture header (picture header syntax) may include information/parameters commonly applicable to the picture. The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may information/parameters commonly applicable to multiple layers. The DCI (DCI syntax) may include information/parameters related to decoding capability.

In the present disclosure, a high level syntax (HLS) may include at least one of the APS syntax, the PPS syntax, the SPS syntax, the VPS syntax, the DCI syntax, the picture header syntax or the slice header syntax. In addition, in the present disclosure, a low level syntax (LLS) may include, for example, a slice data syntax, a CTU syntax, a coding unit syntax, a transform unit syntax, etc.

In the present disclosure, image/video information encoded by the encoding apparatus and signaled to the decoding apparatus in the form of a bitstream may include not only in-picture partitioning related information, intra/inter prediction information, residual information, in-loop filtering information but also information on the slice header, information on the picture header, information on the APS, information on the PPS, information on the SPS, information on the VPS and/or information on the DCI. In addition, the image/video information may further include general constraint information and/or information on a NAL unit header.

Hereinafter, a media file including encoded image information will be described in detail.

Media File

The encoded image information may be configured (or formatted) based on a predetermined media file format to generate a media file. For example, the encoded image information may form a media file (segment) based on one or more NAL units/sample entries for the encoded image information.

A media file may include sample entry(s) and track(s). In one example, a media file may include various records, and each record may include information related to a media file format or information related to an image. In one example, one or more NAL units may be stored in a configuration record (or decoder configuration record) field in the media file. Additionally, the media file may contain an operating point record and/or an operating point group box. In this disclosure, a decoder configuration record supporting Versatile Video Coding (VVC) may be referred to as a VVC decoder configuration record. Likewise, an operating point record supporting VVC may be referred to as a VVC operating point record.

The term "sample" used in the media file format may mean all data associated with a single time or single element of any one of three sample arrays (Y, Cb, Cr) representing a picture. When the term "sample" is used in the context of a track (in a media file format), "sample" may refer to all data associated with a single time of the track. Here, the time may correspond to a decoding time or a composition time. Also, when the term "sample" is used in the context of a picture (e.g., luma sample), "sample" may indicate a single element of any one of three sample arrays representing the picture.

Figure 7:
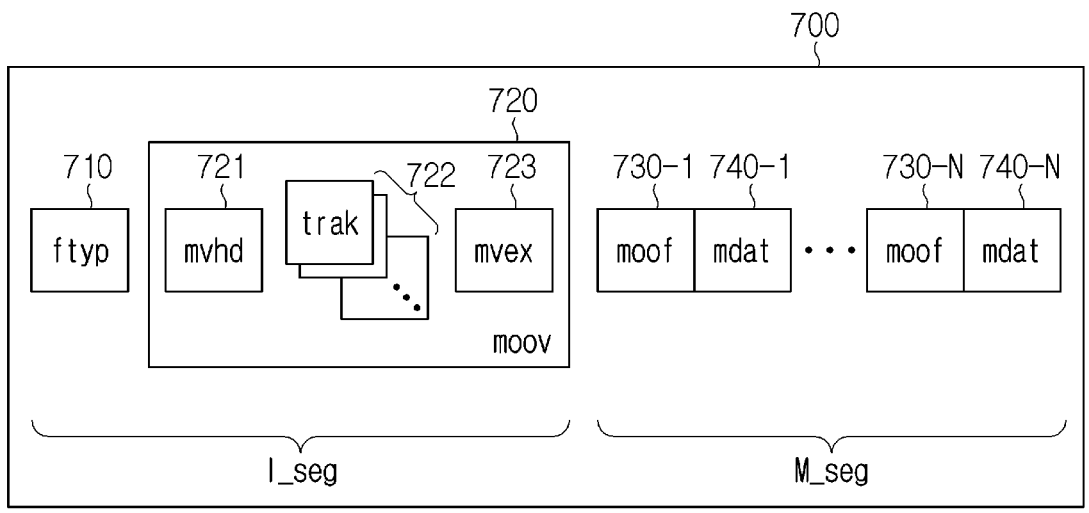
FIG. 7 is a view illustrating an example of a media file structure.

FIG. 7 is a view illustrating an example of a media file structure.

As described above, in order to store and transmit media data such as audio, video, or image, a standardized media file format may be defined. In some embodiments, the media file may have a file format according to the ISO base media file format (ISO BMFF).

A media file may include one or more boxes. Here, the box may be a data block or object including media data or metadata related to the media data. Within a media file, boxes may form a hierarchical structure. Accordingly, the media file may have a form suitable for storage and/or transmission of large-capacity media data. Also, the media file may have a structure that facilitates access to specific media data.

Referring to FIG. 7, the media file 700 may include an ftyp box 710, a moov box 720, a moof box 730, and an mdat box 740.

The ftyp box 710 may include a file type, file version, and/or compatibility related information of the media file 700. In some embodiments, the ftyp box 710 may be located at the beginning of the media file 700.

The moov box 720 may include metadata describing the media data in the media file 700. In some embodiments, the moov box 720 may be present in an uppermost layer among metadata-related boxes. Also, the moov box 720 may include header information of the media file 700. For example, the moov box 720 may include a decoder configuration record as decoder configuration information.

The moov box 720 is a sub-box, and may include an mvhd box 721, a trak box 722 and an mvex box 723.

The mvhd box 721 may include presentation-related information (e.g., media creation time, change time, period, etc.) of media data in the media file 700.

The trak box 722 may include metadata for a track of media data. For example, the trak box 722 may contain stream-related information, presentation-related information, and/or access-related information for an audio track or a video track. A plurality of trak boxes 722 may be present according to the number of tracks present in the media file 700.

The mvex box 723 may include information on whether one or more movie fragments is present in the media file 700. The movie fragment may be a part of media data obtained by dividing media data in the media file 700. The movie fragment may include one or more coded pictures. For example, the movie fragment may include one or more picture groups (GOPs), and each picture group may include a plurality of coded frames or pictures. The movie fragment may be stored in each of the mdat boxes 740-1 to 740-N (where N is an integer greater than or equal to 1).

The moof boxes 730-1 to 730-N (where N is an integer greater than or equal to 1) may include metadata for movie fragments, that is, mdat boxes 740-1 to 740-N. In some embodiments, the moof boxes 730-1 to 730-N may be present in an uppermost layer among metadata-related boxes of the movie fragment.

The mdat boxes 740-1 to 740-N may include actual media data. A plurality of mdat boxes 740-1 to 740-N may be present according to the number of movie fragments present in the media file 700. Each of the mdat box 740-1 to 740-N may include one or more audio samples or video samples. In one example, a sample may mean an access unit (AU). When the decoder configuration record is stored in the sample entry, the decoder configuration record may include a size of a length field for specifying the length of a Network Abstraction Layer (NAL) unit to which each sample belongs as well as a parameter set.

In some embodiments, the media file 700 may be processed and stored and/or transmitted in units of segments. The segment may include an initialization segment I_seg and a media segment M_seg.

The initialization segment I_seg may be an object type data unit including initialization information for accessing a representation. The initialization segment I_seg may include the aforementioned ftyp box 710 and/or moov box 720.

The media segment M_seg may be an object type data unit including temporally divided media data for a streaming service. The media segment M_seg may include the aforementioned moof boxes 730-1 to 230-N and mdat boxes 740-1 to 740-N. Although not shown in FIG. 7, the media segment M_seg may further include a styp box including segment type related information and a sidx box including identification information of subsegments included in the media file 700 (optional).

As described above, media data may be encapsulated into a media file according to a file format such as ISO BMFF. In addition, the media file may be transmitted through an image signal according to the MMT standard or the MPEG-DASH standard.

Figure 8:
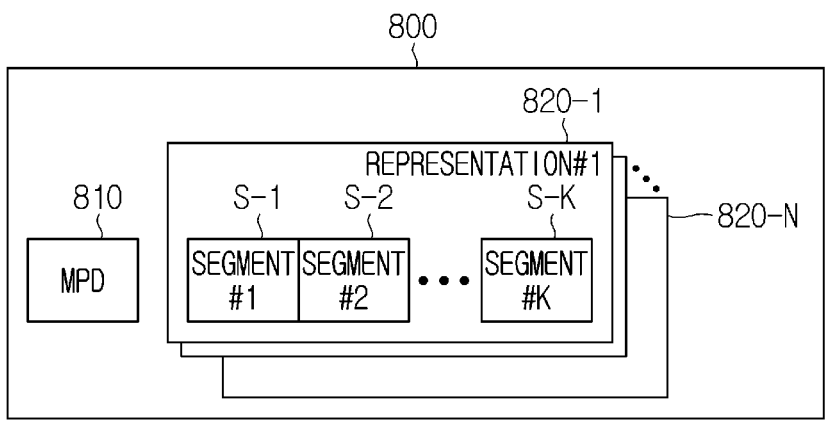
FIG. 8 is a view illustrating an example of an image signal structure.

FIG. 8 is a view illustrating an example of an image signal structure.

Referring to FIG. 8, an image signal conforms to the MPEG-DASH standard and may include an MPD 810 and a plurality of representations 820-1 to 820-N.

The MPD 810 is a file including detailed information on media presentation, and may be expressed in an XML format. The MPD 810 may include information on a plurality of representations 820-1 to 820-N (e.g., bit rate of streaming content, image resolution, frame rate, etc.) and information on URLs of HTTP resources (e.g., initialization segment and media segments).

Each of the representations 820-1 to 820-N (where N is an integer greater than 1) may be divided into a plurality of segments S-1 to S-K (where K is an integer greater than 1). Here, the plurality of segments S-1 to S-K may correspond to the initialization segment and media segments described above with reference to FIG. 7. The K-th segment S-K may represent the last movie fragment in each of the representations 820-1 to 820-N. In some embodiments, the number (that is, the value of K) of segments S-1 to S-K included in each of the representations 820-1 to 820-N may be different from each other.

Each of the segments S-1 to S-K may include actual media data, such as one or more video or image samples. The characteristics of the video or image samples contained within each of the segments S-1 to S-K may be described by the MPD 810.

Each of the segments S-1 to S-K has a unique URL (Uniform Resource Locator) and thus may be accessed and reconstructed independently.

Meanwhile, in order to store VVC content, three types of elementary streams may be defined. First, a video elementary stream that does not include any parameter set may be defined. In this case, all parameter sets may be stored in one sample entry or a plurality of sample entries. Second, parameter sets may be included, and a video and parameter set elementary stream that may include parameter sets stored in one sample entry or a plurality of sample entries may be defined. Third, a non-VCL elementary stream including non-VCL NAL units synchronized with an elementary stream carried in a video track may be defined. In this case, the non-VCL track may not include a parameter set in the sample entries.

An operating point is a temporal subset of an output layer set (OLS), and may be identified by an output layer set (OLS) index and the maximum value of TemporalId. Each operating point may be associated with a Profile, Tier and Level (PTL) defining a conformance point of the corresponding operating point. In the ISO based media file format (ISO BMFF) for VVC, operating point information may be signaled within a sample of a 'vopi' type group box or an 'opeg' type entity group. Operating point information may be used to identify samples and sample entries for each operating point.

Operating Point Information Sample Group

Information on different operating points provided by a VVC bitstream and constitution of the operating points may be provided to an application using an operating point information sample group 'vopi'. In this case, each operating point may be associated with an output layer set, a maximum TemporalId value, and PTL signaling. All of the above information may be captured by the 'vopi' sample group. In addition to the above information, the sample group may provide dependency information between layers. If more than one VVC track is present for a VVC bitstream and no operating point entity group is present for the VVC bitstream, the following two may apply. First, among the VVC tracks for the VVC bitstream, there shall be only one track carrying the 'vopi' sample group. Second, all other VVC tracks in the VVC bitstream shall have an 'oref' type track reference for a track carrying the 'vopi' sample group.

For a specific sample in a track, a temporally collocated sample in other tracks may be defined as having the same decoding time as the decoding time of the specific sample. Within a track TN with an 'oref' track referring to a track $T_k$ carrying a 'vopi' sample group, the following may be applied to each sample SN. If a temporally collocated sample $S_k$ is present within the track $T_k$, the sample SN may be associated with the same 'vopi' sample group entry as the sample $S_k$. Otherwise, the sample SN may be associated with the same 'vopi' sample group entry as the last sample in the track $T_k$ preceding the sample SN in decoding time.

When a plurality of VPSs are referred to by the VVC bitstream, a sample group description box having a 'vopi' group type may include a plurality of entries. Alternatively, in the more general case where there is a single VPS, a default sample group mechanism may be used. The default sample group mechanism may be defined in a standard document such as ISO/IEC 14496-12. Also, the operating point information sample group may be included in a sample table box instead of being included in each track fragment. For example, the syntax grouping_type_parameter may not be defined for the syntax SampleToGroupBox having the 'vopi' type.

FIG. 9 is a diagram illustrating an example of a syntax structure VvcOperatingPointsRecord signaling operating point information.

Referring to FIG. 9, VvcOperatingPointsRecord may include a syntax element num_profile_tier_level_minus1. num_profile_tier_level_minus1 plus 1 may indicate the number of subsequent profiles, tier and level (PTL) combinations and fields related thereto.

In addition, VvcOperatingPointsRecord may include a syntax element ptl_max_temporal_id[i]. ptl_max_temporal_id[i] may indicate a maximum TemporalID of NAL units of an associated bitstream, for an i-th PTL structure. Here, i may be equal to or greater than 0 and may be equal to or less than a value of num_profile_tier_level_minus1. ptl_max_temporal_id[i] may have the same value as the below-described max_temporal_id, but the semantics of ptl_max_temporal_id[i] may be different from those of max_temporal_id.

In addition, VvcOperatingPointsRecord may include a syntax element ptl[i]. ptl[i] may indicate an i-th PTL structure. Here, i may be equal to or greater than 0 and may be equal to or less than a value of num_profile_tier_level_minus1. ptl[i] may have a class type of VvcPTLRecord(ptl_max_temporal_id[i]+1) to be described later.

In addition, VvcOperatingPointsRecord may include a syntax element all_independent_layers_flag. all_independent_layers_flag of a first value (e.g., 0) may indicate that at least one layer is not independently coded. In contrast, all_independent_layers_flag of a second value (e.g., 1) may indicate that all layers are independently coded without using inter-layer prediction.

When all_independent_layers_flag is a first value (e.g., 0), VvcOperatingPointsRecord may include a syntax element ols_mode_idc. ols_mode_idc may indicate an output layer set mode index. In contrast, when all_independent_layers_flag is a second value (e.g., 1), VvcOperatingPointsRecord may include a syntax element each_layer_is_an_ols_flag. each_layer_is_an_ols_flag may indicate whether an output layer set includes only one layer. The above-described all_independent_layers_flag, ols_mode_idc and each_layer_is_an_ols_flag may be, for example, defined in a standard document such as ISO/IEC 23090-3.

In addition, VvcOperatingPointsRecord may include a syntax element num_operating_points. num_operating_points may indicate the number of operating points.

In addition, VvcOperatingPointsRecord may include a syntax element output_layer_set_idx. output_layer_set_idx may indicate an index of an output layer set defining the corresponding operating point. Mapping between output_layer_set_idx and layer_id to be described later shall be identical to that specified by VPS, for the same index as output_layer_set_idx.

In addition, VvcOperatingPointsRecord may include a syntax element ptl_idx. ptl_idx may indicate a zero-based index of a listed PTL structure for an output layer set having the same index as output_layer_set_idx.

In addition, VvcOperatingPointsRecord may include a syntax element max_temporal_id. max_temporal_id may indicate a maximum TemporalId of NAL units of the corresponding operating point. Here, the maximum TemporalId may have semantics different from the maximum TemporalId indicated in a layer information sample group. However, both of these may have the same value as each other.

In addition, VvcOperatingPointsRecord may include a syntax element layer_count. layer_count may indicate the number of layers necessary for the corresponding operating point. layer_count may be, for example, defined in a standard document such as ISO/IEC 23090-3.

In addition, VvcOperatingPointsRecord may include a syntax element layer_id. layer_id may indicate nuh_layer_id values for layers of the corresponding operating point.

In addition, VvcOperatingPointsRecord may include a syntax element is_outputlayer. is_outputlayer may indicate whether a layer of the corresponding operating point is an output layer.

The above-described syntax elements output_layer_set_idx, ptl_idx, max_temporal_id and layer_count may be present in a loop for the operating point (i.e., for (i=0; i<num_operating_points; i++)). Accordingly, the number of syntax elements included in VvcOperatingPointsRecord may correspond to the number of operating points (i.e., num_operating_points).

In addition, the above-described syntax elements layer_id and is_outputlayer may be present in a loop for a layer for each operating point (i.e., for (j=0; j<layer_count; j++)). Accordingly, the number of syntax elements included in VvcOperatingPointsRecord may correspond to the number of layers necessary for the corresponding operating point (i.e., layer_count).

Meanwhile, VvcOperatingPointsRecord may include a syntax element frame_rate_info_flag. frame_rate_info_flag of a first value (e.g., 0) may indicate that no frame rate information is present for the corresponding operating point. In contrast, frame_rate_info_flag of a second value (e.g., 1) may indicate that frame rate information is present for the corresponding operating point.

In addition, VvcOperatingPointsRecord may include a syntax element bit_rate_info_flag. bit_rate_info_flag of a first value (e.g., 0) may indicate that no bitrate information is not present for the corresponding operating point. In contrast, bit_rate_info_flag of a second value (e.g., 1) may indicate that bitrate information is present for the corresponding operating point.

In addition, VvcOperatingPointsRecord may include a syntax element avgFrameRate. avgFrameRate may indicate an average frame rate in units of 'frames/(256 seconds)' for the corresponding operating point. avgFrameRate equal to 0 may indicate that the average frame rate is not specified.

In addition, VvcOperatingPointsRecord may include a syntax element constantFrameRate. constantFrameRate equal to 1 may indicate that a stream of the corresponding operating point has a constant frame rate. In contrast, constantFrameRate equal to 2 may indicate that representation of each temporal layer in the stream of the corresponding operating point has a constant frame rate. In contrast, constantFrameRate equal to 0 may indicate that the stream of the corresponding operating point has a constant frame rate or may not have a constant frame rate.

In addition, VvcOperatingPointsRecord may include a syntax element maxBitRate. maxBitRate may indicate a maximum bit rate in units of 'bits/second' of the stream of the corresponding operating point.

In addition, VvcOperatingPointsRecord may include a syntax element max_layer_count. max_layer_count may indicate the number of all layers in all operating points associated with an associated base track.

In addition, VvcOperaingPointsRecord may include a syntax element layerID. layerID may indicate nuh_layer_id of a layer in which all direct reference layers are provided in a subsequent loop of direct_ref_layerID.

In addition, VvcOperatingPointsRecord may include a syntax element num_direct_ref_layers. num_direct_ref_layers may indicate the number of direct reference layers for a layer with nuh_layer_id equal to layerID.

In addition, VvcOperaingPointsRecord may have a syntax element direct_ref_layerID. direct_ref_layerID may indicate nuh_layer_id of the corresponding direct reference layer.

Operating Point Entity Group

An operating point entity group may be defined to provide mapping of tracks to operating points and profile level information of the operating points. When aggregating samples of tracks mapped to an operating point described in an entity group, an implicit reconstruction process may not require additional removing of NAL units to generate a matched VVC bitstream. Tracks belonging to the operating point entity group shall have an 'oref' type track reference for group_id indicated in the operating point entity group. All entity_id values included in the operating point entity groups shall belong to the same VVC bitstream. The OperatingPointGroupBox shall be included in the GroupsListBox in the movie-level MetaBox, and shall not be included in the file-level or track-level MetaBoxes.

FIG. 10 is a diagram illustrating an example of a syntax structure OperatingPointGroupBox signaling an operating point entity group.

Referring to FIG. 10, OperatingPointGroupBox may include a syntax element num_profile_tier_level_minus1. The semantics of the syntax element are as described above with reference to FIG. 9.

In addition, OperatingPointGroupBox may include a syntax element opeg_ptl[i]. opeg_ptl[i] may indicate an i-th PTL structure. Here, i may be equal to or greater than 0 and may be equal to or less than a value of num_profile_tier_level_minus1. opeg_ptl[i] may have a class type of VvcPTLRecord(0) to be described later.

In addition, OperatingPointGroupBox may include a syntax element num_operating_points specifying the number of operating points.

In addition, OperatingPointGroupBox may include syntax elements output_layer_set_idx, ptl_idx, max_temporal_id and layer_count. The semantics of the syntax elements are as described above with reference to FIG. 9. The syntax elements may be present in a loop for an operating point (i.e., for (i=0; i<num_operating_points; i++)). Accordingly, the number of syntax elements included in OperatingPointGroupBox may correspond to the number of operating points (i.e., num_operating_points).

In addition, OperatingPointGroupBox may include syntax elements layer_id and is_outputlayer. The semantics of the syntax elements are as described above with reference to FIG. 9. The syntax elements may be present in a loop relating to a layer for each operating point. Accordingly, the number of syntax elements included in OperatingPointGroupBox may correspond to the number of layers necessary for the corresponding operating point (i.e., layer_count).

In addition, OperatingPointGroupBox may include syntax elements frame_rate_info_flag, bit_rate_info_flag, avgFrameRate, constantFrameRate, maxBitRate and avgBitRate. The semantics of the syntax elements are as described above with reference to FIG. 9.

In addition, OperatingPointGroupBox may include a syntax element entity_count. entity_count may indicate the number of tracks present in the operating point.

In addition, OperatingPointGroupBox may include a syntax element entity_idx. entity_idx may indicate an index for an entity_id list in an entity group belonging to an operating point.

frame_rate_info_flag may indicate whether frame rate information is present at an operating point. bit_rate_info_flag may indicate whether bit rate information is present at an operating point. entity_count may indicate the number of tracks present at the operating point. entity_idx may indicate an index for an entity_id list of an entity group belonging to an operating point.

Decoder Configuration Record

When a decoder configuration record is stored in a sample entry, the decoder configuration record may include the size of a length field used for each sample in order to indicate lengths and parameter sets of NAL units. The decoder configuration record may be framed externally. The size of the decoder configuration record may be provided in a structure containing the decoder configuration record.

The decoder configuration record may include a version field. A version of this specification may define version 1 of the decoder configuration record. If the version number is not recognized, the decoder configuration record or a stream to which the decoder configuration record applies shall not be decoded. A compatible extension to the decoder configuration record may extend the decoder configuration record and may not change a configuration version code.

If a track fundamentally contains a VVC bitstream or resolves 'subp' track references, VvcPtlRecord shall be present in the decoder configuration record. If ptl_present_flag is equal to 0 in the decoder configuration record of the track, then the track shall have an 'oref' track reference. Values of syntax elements of VvcPTLRecord, chroma_format_idc and bit_depth_minus8 shall be valid for all parameter sets activated when the stream described by the decoder configuration record is decoded. In this regard, the following constraints may apply.

A profile indicator general_profile_idc shall indicate a profile that a stream associated with the decoder configuration record conforms to. If SPSs are marked with different profiles, a stream may need to be inspected to determine a profile that the entire stream conforms to. If the entire stream has not been inspected or there is no profile that the entire stream conforms to as a result of inspection, the entire stream may be split into two or more substreams with separate configuration records for which the above rules may be satisfied.

A tier indicator general_tier_flag shall indicate a tier greater than or equal to the highest tier indicated in all parameter sets.

Each bit of general constraint information general_constraint_info may be set only when all parameter sets set a corresponding bit.

A level indicator general_level_idc shall indicate a level of capability greater than or equal to the highest level indicated for the highest tier in all parameter sets.

chroma_format_idc may indicate a chroma format applied to a tack. The following constraints may be applied to chroma_format_idc. When the value of sps_chroma_format_idc is the same in all SPSs referenced by the NAL unit of the track, chroma_format_idc shall be equal to sps_chroma_format_idc (Condition 1). When Condition 1 is not satisfied and ptl_present_flag is equal to a second value (e.g., 1), chroma_format_idc shall be equal to vps_ols_dpb_chroma_format[output_layer_set_idx] (Condition 2). When both conditions 1 and 2 are not satisfied, chroma_format_idc shall not be present.

bit_depth_minus8 may indicate a bit depth applied to a track. The following constraints may be applied to bit_depth_minus8. When the value of sps_bitdepth_minus8 is the same in all SPSs referenced by the NAL unit of the track, bit_depth_minus8 shall be equal to sps_bitdepth_minus8 (Condition 1). When Condition 1 is not satisfied and ptl_present_flag is equal to a second value (e.g., 1), bit_depth_minus8 shall be equal to vps_ols_dpb_bitdepth_minus8[output_layer_set_idx] (Condition 2). When both conditions 1 and 2 are not satisfied, bit_depth_minus8 shall not be present.

The other important format information used in the VCC elementary stream as well as an explicit indicator of chroma format and bit depth may be provided within the VVC decoder configuration record. If the color space representation is different in VUI information of two sequences, two different VVC sample entries may be required.

Meanwhile, there may be an array set to carry initialization NAL units. The NAL unit types may be restricted to indicate only DCI, VPS, SPS, PPS, prefix APS and prefix SEI NAL units. NAL units included in a sample entry may be included immediately after AUD and OPI NAL units or may be included in the beginning part of an access unit reconstructed from a first sample referencing the sample entry. Arrays may be arranged in order of DCI, VPS, SPS, PPS, prefix APS and prefix SEI.

FIG. 11 is a diagram illustrating an example of a syntax structure VvcPTLRecord signaling a PTL record.

Referring to FIG. 11, VvcPTLRecord may include syntax elements general_profile_idc, general_tier_flag, general_sub_profile_idc, general_constraint_info, general_level_idc, ptl_frame_only_constraint_flag, ptl_multilayer_enabled_flag, sublayer_level_present and sublayer_level_idc[i]. The syntax elements may include matching values for general_profile_idc, general_tier_flag and general_sub_profile_idc fields and bits of general_constraint_info( ), general_level_idc, ptl_multilayer_enabled_flag, ptl_frame_only_constraint_flag, sublayer_level_present and sublayer_level_idc[i].

In addition, VvcPTLRecord may include a syntax element avgFrameRate. avgFrameRate may indicate an average frame rate in units of 'frames/(256 seconds)' for a stream to which a decoder configuration record is applied. avgFrameRate of a first value (e.g., 0) may indicate an unspecified average frame rate. avgFrameRate equal to 0 may indicate that an average frame rate is not specified.

In addition, VvcPTLRecord may include a syntax element constantFrameRate. constantFrameRate equal to 1 may indicate that a stream to which a decoder configuration record is applied has a constant frame rate. In contrast, constantFrameRate equal to 2 may indicate that representation of each temporal layer in the corresponding frame has a constant frame rate. In contrast, constantFrameRate equal to 0 may indicate that the corresponding stream may have a constant frame rate or may not have a constant frame rate.

In addition, VvcPTLRecord may include a syntax element numTemporalLayers. numTemporalLayers greater than 1 may indicate that a track to which a decoder configuration record is applied is temporarily extensible. The number of temporal layers (lower layers or temporal lower layers) included in VvcPTLRecord may be equal to numTemporalLayers. numTemporalLayers equal to 1 may indicate that the track to which the decoder configuration record is applied is not temporarily extensible. numTemporalLayers equal to 0 may indicate that it is not known that the track to which the decoder configuration record is applied is temporarily extensible.

In addition, VvcPTLRecord may include a syntax element lengthSizeMinusOne. lengthSizeMinusOne plus 1 may indicate the length of a NALUnitLength field in a VVC video stream sample in byte units in a stream to which the decoder configuration record is applied. For example, the size of one byte may be indicated by 0. The value of the field shall be any one of 0, 1, or 3 corresponding to an encoded length of 1, 2, or 4 bytes, respectively.

In addition, VvcPTLRecord may include a syntax element ptl_present_flag. ptl_present_flag may indicate whether a track includes a VVC bitstream corresponding to a specific output layer set. ptl_present_flag of a second value (e.g., 1) may indicate that the track includes a VVC bitstream corresponding to a specific output layer set. In contrast, ptl_present_flag of a first value (e.g., 0) may indicate that the track may not include a VVC bitstream corresponding to a specific output layer set and may include one or more individual layers doing not form an output layer set or individual lower layers except for a lower layer having TemporalId equal to 0.

In addition, VvcPTLRecord may include a syntax element num_sub_profiles. num_sub_profiles may indicate the number of lower profiles indicated in the decoder configuration record.

In addition, VvcPTLRecord may include a syntax element track_ptl. track_ptl may indicate a PTL of an output layer set indicated by a VVC bitstream included in a track.

In addition, VvcPTLRecord may include a syntax element output_layer_set_idx. output_layer_set_idx may indicate an index of an output layer set expressed by a VVC bitstream included in a track. output_layer_set_idx may be used as a value of a variable TargetOlsIdx provided by an external means for a VVC decoder, in order to decode the bitstream included in the track.

In addition, VvcPTLRecord may include a syntax element chroma_format_present_flag. chroma_format_present_flag may indicate whether chroma_format_idc is present. chroma_format_present_flag of a first value (e.g., 0) may indicate that chroma_format_idc is not present. In contrast, chroma_format_present_flag of a second value (e.g., 1) may indicate that chroma_format_idc is present.

In addition, VvcPTLRecord may include a syntax element bit_depth_present_flag. bit_depth_present_flag may indicate whether bit_depth_minus8 is present. bit_depth_present_flag of a first value (e.g., 0) may indicate that bit_depth_minus8 is not present. In contrast, bit_depth_present_flag of a second value (e.g., 1) may indicate that bit_depth_minus8 is present.

In addition, VvcPTLRecord may include a syntax element numArrays. numArrays may indicate the number of NAL unit arrays of an indicated type.

In addition, VvcPTLRecord may include a syntax element array_completeness. array_completeness may indicate whether a NAL unit of a given type is present in a predetermined array. array_completeness of a first value (e.g., 0) may indicate that additional NAL units of an indicated type may not be present. In contrast, array_completeness of a second value (e.g., 1) may indicate that all NAL units of a given type are present but are not present in a stream. Default and allowed values may be restricted by a sample entry name.

In addition, VvcPTLRecord may include a syntax element NAL_unit_type. NAL_unit_type may indicate a type of NAL units in a next array. NAL_unit_type may be restricted to take one of values specifying DCI, VPS, SPS, PPS, APS, prefix SEI or suffix SEI NAL units.

In addition, VvcPTLRecord may include a syntax element numNalus. numNalus may indicate the number of NAL units of an indicated type included in the decoder configuration record for a stream to which the decoder configuration record is applied. An SEI array shall include only an SEI message of a "declarative" nature, that is, a message providing information on an entire stream. An example of such an SEI may correspond to a user data SEI.

In addition, VvcPTLRecord may include a syntax element nalUnitLength. nalUnitLength may indicate the length of the NAL unit in byte units. The NAL unit may include DCI, VPS, SPS, PPS, APS or declarative SEI NAL unit.

VVC Bitstream Reconstruction and Data Sharing

To reconstruct an access unit from samples of multiple tracks carrying a multi-layer VVC bitstream, an operating point may first be determined. When the VVC bitstream is represented by multiple tracks, a file parser may identify tracks required for the selected operating point through the following process.

All tracks with VVC sample entries may be found.

When a track contains an 'oref' track reference to the same ID, the ID may be identified as a VVC track or an 'opeg' entity group.

Such an operating point may be selected from an 'opeg' entity group or a 'vopi' sample group suiting decoding capacity and application purpose.

When an 'opeg' entity group is present, a track set may accurately represent a selected operating point. Accordingly, a VVC bitstream may be reconstructed and decoded from the track set.

When an 'opeg' entity group is not present (that is, when a 'vopi' sample group is present), a track set necessary to decode an operating point selected from 'vopi' and 'linf' sample groups may be found.

In order to reconstruct the bitstream from multiple VVC tracks carrying the VVC bitstream, first, TemporalId which is the highest target value needs to be determined. When several tracks contain data for an access unit, alignment of each sample within the tracks may be performed based on a sample decoding time (i.e., a time-to-sample table that does not consider edit lists). When a VVC bitstream is represented by several VVC tracks, the decoding time of the samples shall be set so that the access unit order is correct if the tracks are combined into a single stream aligned in ascending order of decoding time. A sequence of access units may be reconstructed from each sample in the required tracks according to an implicit reconstruction process.

When an operating point information sample group is present, the required track may be selected based on a carrying layer and reference layer as indicated in the operating point information and layer information sample group. When an operating point entity group is present, the required track may be selected based on information on OperatingPointGroupBox. When reconstructing a bitstream in which a VCL NAL unit contains a sublayer with a TemporalId greater than 0, all sublayers within the same layer (i.e., a sublayer in which the VCL NAL unit has a smaller TemporalId) may be included in a resulting bitstream. In addition, the required track may be selected. When reconstructing an access unit, picture units of samples having the same decoding time may be placed in the access unit in ascending order of nuh_layer_id values.

If the access unit is reconstructed to a dependent layer and max_tid_il_ref_pics_plus1 is greater than a first value (e.g., 0), the sublayer of the reference layer in which a VCL NAL unit has a TemporalId of max_tid_il_ref_pics_plus1−1 or less within the same layer may be included in the resulting bitstream. In addition, the required track may be selected. When an access unit is reconstructed to a dependent layer and max_tid_il_ref_pics_plus1 is equal to a first value (e.g., 0), only the IRAP picture unit of the reference layer may be included in the resulting bitstream. In addition, the required track may be selected. If a 'subp' track reference is included in the VVC track, each picture unit may be reconstructed with additional constraints for end of sequence (EOS) and end of bitstream (EOB) NAL units. The reconstruction process may be repeated for each layer of a target operating point in an increasing order of nuh_layer_id. Otherwise, each picture unit may be reconstructed. Reconstructed access units may be placed in the VVC bitstream in order of increasing decoding time. In addition, copies of EOB and EOS NAL units may be removed from the VVC bitstream.

In the case of access units belonging to different sublayers stored in the same coded video sequence of the VVC bitstream and stored in several tracks, there may be two or more tracks containing an EOS NAL unit with specific nuh_layer_id values in each sample. In this case, only one of the EOS NAL units shall be kept in the last one of these access units in the last reconstructed bitstream and shall be placed after all NAL units except the last EOB NAL unit of this access unit. In addition, other EOS NAL units may be discarded. Similarly, there may be one or more tracks containing EOB NAL units in each sample. In this case, only one of the EOB NAL units shall be kept in the last reconstructed bitstream and shall be placed at the end of this access unit. In addition, other EOS NAL units may be discarded.

Since a particular layer or sublayer may be represented by one or more tracks, when finding a track required for an operating point, the required track may be selected from among the track sets carrying all of the particular layer or sublayer. If no operating point entity group is present, after selecting among tracks carrying the same layer or sublayer, the last required track may still collectively carry some layers or sublayers not belonging to the target operating point. The reconstructed bitstream for the target operating point shall contain no layers or sublayers that are carried in the last required track but do not belong to the target operating point. The VVC decoder configuration may use, as input, a bitstream corresponding to a target output layer set index corresponding to TargetOlsIdx and HighestTid variables and the highest TemporalId value of a target operating point. The file parser may check whether or not the reconstructed bitstream contains other layers and sublayers other than those included in the target operating point before being sent to a VVC decoder.

According to the existing syntax structures described above with reference to FIGS. 9 and 10, output layer set information including an output layer set index, a list of layers (member layers) included in the output layer set, and a flag specifying whether the member layers are output layers is repeatedly signaled through a loop for operating points. Accordingly, since duplicated information may be repeatedly signaled, redundancy and signaling overhead may increase.

In order to solve this problem, embodiments of the present disclosure may include at least one of the following configurations. In this case, the above configurations may be implemented individually or may be implemented in a combination of two or more.

(Configuration 1): In signaling operating point information, instead of signaling output layer set information (e.g., index, member layers, output layer flag, etc.) within a loop of operating points, a list of output layer sets may be signaled in a separate loop.

(Configuration 2): Each entry of the operating point may include an index to an entry of output layer set information signaled in a loop of output layer sets.

(Configuration 3): For each entry of the output layer set, at least one of the following information may be signaled.
Index specifying the index of the output layer set defined in the video parameter set (VPS) of the VVC bitstream carried within the bitstream.
number of layers in the output layer set
list of layer ids in the output layer set
for each layer, flag specifying whether it is an output layer (Configuration 4): Information on the mode of the output layer set may be present, and the information may be used to determine whether other information on each output layer set entry is present.

(Configuration 5): When the output layer set mode information is 0 or 1, for each entry of the output layer set, there may not be information on the number of layers in the output layer set, and the information may be inferred to be the same value as the index of the entry.

(Configuration 6): When the output layer set mode information is 0 or 1, for each entry of the output layer set, there may not be information on the index of the output layer set, and the information may be inferred to a value equal to the index of the entry.

(Configuration 7): There may be a flag specifying which output layer set entry has a sparse layer id. The output layer set entry having a sparse layer id may mean that a layer id gap is present. In this case, the output layer set entry may have layer id x and layer id x+y, where y is greater than x, but may not have layer id k, where k is greater than x and less than y. In the present disclosure, the flag may be referred to as sparse_layer_id_present_flag.

(Configuration 8): When output layer set mode information is 0 or 1 and sparse_layer_id_present_flag is 0, an output layer flag is not present, and the following may be applied to each entry of the output layer set.
When the output layer set mode is 0, only a layer with the highest layer id is an output layer.
When the output layer set mode is 1, all layers are output layers.

Hereinafter, embodiments of the present disclosure including all or some of the above-described configurations will be described in detail.

Embodiment 1

FIG. 12 is a diagram illustrating a syntax structure VvcOperatingPointsRecord signaling operating point information according to an embodiment of the present disclosure. The syntax structure of FIG. 12 may be partly equal/similar to the syntax structure of FIG. 9. Hereinafter, differences from the syntax structure of FIG. 9 will be mainly described.

Referring to FIG. 12, VvcOperatingPointsRecord may include a syntax element num_profile_tier_level_minus1. num_profile_tier_level_minus1 plus 1 may indicate the number of subsequent profiles, tier and level (PTL) combinations and fields associated therewith.

Also, VvcOperatingPointsRecord may include a syntax element ptl_max_temporal_id[i]. ptl_max_temporal_id[i] may indicate, for an i-th PTL structure, a maximum TemporalID of NAL units of the associated bitstream. Here, i may be greater than or equal to 0 and less than or equal to a value of num_profile_tier_level_minus1. ptl_max_temporal_id[i] may have the same value as max_temporal_id to be described later, but semantics of ptl_max_temporal_id[i] may be different from those of max_temporal_id.

Also, VvcOperatingPointsRecord may include a syntax element ptl[i]. ptl[i] may indicate an i-th PTL structure. Here, i may be greater than or equal to 0 and less than or equal to the value of num_profile_tier_level_minus1. ptl[i] may have a class type of VvcPTLRecord (ptl_max_temporal_id[i]+1). The VvcPTLRecord syntax structure is as described above with reference to FIG. 11.

In addition, VvcOperatingPointsRecord may include a syntax element num_olss. num_olss may indicate the number of output layer sets present in the VvcOperatingPointsRecord syntax structure.

In addition, VvcOperatingPointsRecord may include a syntax element ols_mode_idc. ols_mode_idc may indicate the mode of the output layer sets present in the VvcOperatingPointsRecord syntax structure. Here, the mode of the output layer sets may be, for example, defined in the standard document such as ISO/IEC 23090-3.

In addition, VvcOperatingPointsRecord may include a syntax element sparse_layer_id_present_flag. sparse_layer_id_present_flag of a first value (e.g., 0) may indicate that a layer id gap is not present in each output layer set present in the VvcOperatingPointsRecord syntax structure. In contrast, sparse_layer_id_present_flag of a second value (e.g., 1) may indicate that the above-described constraints are not applied. In other words, when sparse_layer_id_present_flag has a second value (e.g., 1), a layer id gap may be present in each output layer set present in the VvcOperatingPointsRecord syntax structure.

Meanwhile, VvcOperatingPointsRecord does not include the syntax elements each_layer_is_an_ols_flag and all_independent_layers_flag described above with reference to FIG. 9. Accordingly, VvcOperatingPointsRecord may include a syntax element ols_mode_idc, regardless of whether all layers are independently coded (that is, the value of all_independent_layers_flag). In this regard, VvcOperatingPointsRecord may be different from the case of FIG. 9 in which it includes a syntax element ols_mode_idc when all_independent_layers_flag has a first value (e.g., 0) and includes a syntax element each_layer_is_an_ols_flag when all_independent_layers_flag has a second value (e.g., 1). In addition, VvcOperatingPointsRecord may be different from the case of FIG. 9 in that it includes a syntax element sparse_layer_id_present_flag.

In addition, VvcOperatingPointsRecord may include a syntax element plt_idx[i]. plt_idx[i] may indicate a zero-based index of a listed PTL structure for an i-th output layer set. Here, i may be equal to or greater than 0 and may be equal to or less than a value of num_olss.

In addition, VvcOperatingPointsRecord may include a syntax element output_layer_set_idx[i]. output_layer_set_idx[i] may indicate an index of an i-th output layer set present in the VvcOperatingPointsRecord syntax structure specified by a list of output layer sets in a video parameter set (VPS). Here, i may be equal to or greater than 0 and may be equal to or less than a value of num_olss. In an example, output_layer_set_idx[i] may be present (or signaled) when ols_mode_idc is 2. In another example, output_layer_set_idx[i] may be present when ols_mode_idc is 0 or 1. However, the embodiments of the present disclosure are not limited to the above examples. For example, output_layer_set_idx[i] may be present when ols_mode_idc is 0 to 2 or may be present regardless of the value of ols_mode_idc. When output_layer_set_idx[i] is not present, the value of output_layer_set_idx[i] may be inferred to be a value equal to i.

In addition, VvcOperatingPointsRecord may include a syntax element layer_count[i]. layer_count[i] may indicate the number of layers in the i-th output layer set. Here, i may be equal to or greater than 0 and less than the value of num_olss. In an example, layer_count[i] may be present (or signaled) when ols_mode_idc is 2. In another example, layer_count[i] may be present when ols_mode_idc is 0 or 1. However, embodiments of the present disclosure are not limited to the above examples. For example, layer_count[i] may be present when ols_mode_idc is 0 to 2, or may be present regardless of the value of ols_mode_idc. When layer_count[i] is not present, the value of layer_count[i] may be inferred to be a value equal to i+1.

In addition, VvcOperatingPointsRecord may include a syntax element layer_id[i][j]. layer_id[i][j] may indicate a nuh_layer_id value for the j-th layer in the i-th output layer set. Here, i may be equal to or greater than 0 and less than the value of num_olss, and j may be equal to or greater than 0 and less than the value of layer_count. In an example, layer_id[i][j] may be present (or signaled) when ols_mode_idc is 2 or sparse_layer_id_present_flag has a second value (e.g., 1). However, embodiments of the present disclosure are not limited to the above examples. For example, layer_id[i][j] may be present when ols_mode_idc is 0 or 1, or may be present regardless of values of ols_mode_idc and sparse_layer_id_present_flag. When layer_id[i][j] is not present, the value of layer_id[i][j] may be inferred to be a value equal to j.

Also, VvcOperatingPointsRecord may include a syntax element is_output_layer[i][j]. is_output_layer[i][j] of a first value (e.g., 0) may indicate that a j-th layer is not an output layer in the i-th output layer set. In contrast, is_output_layer[i][j] of a second value (e.g., 1) may indicate that the j-th layer is an output layer in the i-th output layer set. Here, i may be equal to or greater than 0 and less than the value of num_olss, and j may be equal to or greater than 0 and less than the value of layer_count. In an example, is_output_layer[i][j] may be present (or signaled) when ols_mode_idc is 2 or sparse_layer_id_present_flag has a second value (e.g., 1). However, embodiments of the present disclosure are not limited to the above examples. For example, is_output_layer[i][j] may be present when ols_mode_idc is 0 or 1, or may be present regardless of values of ols_mode_idc and sparse_layer_id_present_flag. When is_output_layer[i][j] is not present, the value of is_output_layer[i][j] may be inferred as follows.

When ols_mode_idc is 1, the value of is_output_layer[i][j] may be inferred to be a second value (e.g., 1).

In contrast, when is_output_layer[i][j] is 0 and j is layer_count[i]−1, the value of is_output_layer[i][j] may be inferred to be a second value (e.g., 1).

In the other cases, the value of is_output_layer[i][j] may be inferred to be a first value (e.g., 0).

Meanwhile, the above-described syntax elements ptl_idx[i], output_layer_set_idx[i], layer_count[i], layer_id[i][j], and is_output_layer[i][j] may be present in a loop for the output layer sets (i.e., for (i=0; i<num_olss; i++)). Accordingly, the number of syntax elements included in VvcOperatingPointsRecord may correspond to the number of output layer sets (i.e., num_olss). In this regard, VvcOperatingPointsRecord may be different from the case of FIG. 9 in which the syntax elements ptl_idx, output_layer_set_idx, layer_count, layer_id, and is_outputlayer are present in a loop for operating points (i.e., for (i=0; i<num_operating_points; i++).

In addition, VvcOperatingPointsRecord may include a syntax element num_operating_points. num_operating_points may indicate the number of operating points.

In addition, VvcOperatingPointsRecord may include a syntax element ols_idx. ols_idx may indicate an index of an output layer set associated with an operating point specified in a list of output layer sets in the VvcOperatingPointsRecord syntax structure. ols_idx may be different from the above-described syntax element output_layer_set_idx[i] in that it indicates the index of the output layer set associated with the operating point.

In addition, VvcOperatingPointsRecord may include a syntax element max_temporal_id. max_temporal_id may indicate a maximum TemporalId of the NAL units of the corresponding operating point. Here, the maximum TemporalId may have semantics different from the maximum TemporalIId indicated in a layer information sample group. However, both of these may have the same value as each other.

In addition, VvcOperatingPointsRecord may include syntax elements frame_rate_info_flag, bit_rate_info_flag, avgFrameRate, constantFrameRate, maxBitRate, avgBitRate, max_layer_count, layerID, num_direct_ref_layers, direct_ref_layerID and max_tid_il_ref_pics_plus1. The semantics of the syntax elements are as described above with reference to FIG. 9.

As described above, according to Embodiment 1 of the present disclosure, information on the output layer set (e.g., output_layer_set_idx[i], layer_count[i], etc.) may be signaled not for each operating point but for each output layer set. Accordingly, occurrence of redundancy of the information can be prevented, and signaling efficiency can be further improved.

Embodiment 2

FIG. 13 is a diagram illustrating a syntax structure OperatingPointGroupBox signaling an operating point entity group according to an embodiment of the present disclosure. The syntax structure of FIG. 13 may be partly equal/similar to the syntax structure of FIG. 10. Hereinafter, differences from the syntax structure of FIG. 10 will be mainly described.

Referring to FIG. 13, OperatingPointGroupBox may include a syntax element num_profile_tier_level_minus1. The semantics of num_profile_tier_level_minus1 are as described above with reference to FIG. 10.

In addition, OperatingPointGroupBox may include a syntax element opeg_ptl[i]. opeg_ptl[i] may indicate an i-th PTL structure. Here, i may be equal to or greater than 0 and may be equal to or less than a value of num_profile_tier_level_minus1. opeg_ptl[i] may have a class type of VvcPTLRecord(0). The VvcPTLRecord syntax structure is as described above with reference to FIG. 11.

In addition, OperatingPointGroupBox may include syntax elements num_olss, ols_mode_idc and sparse_layer_id_present_flag. The semantics of the syntax elements are as described above with reference to FIG. 12. OperatingPointGroupBox may be different from the case of FIG. 10 in that the above syntax elements are included.

In addition, OperatingPointGroupBox may include a syntax element ptl_idx[i]. Here, i may be less than a value of num_olss equal to or greater than 0. The semantics of the syntax elements are as described above with reference to FIG. 12.

In addition, OperatingPointGroupBox may include syntax elements ptl_idx[i], ouput_layer_set_idx[i] and layer_count[i]. Here, i may be less than a value of num_olss equal to or greater than 0. The semantics of the syntax elements are as described above with reference to FIG. 12. In an example, ouput_layer_set_idx[i] and layer_count[i] may be present (or signaled) when ols_mode_idc is 0 or 1. In another example, ouput_layer_set_idx[i] and layer_count[i] may be present when ols_mode_idc is 2. However, embodiments of the present disclosure are not limited to the above examples. For example, ouput_layer_set_idx[i] and layer_count[i] may be present when ols_mode_idc is 0 to 2, or may be present regardless of the value of ols_mode_idc. Meanwhile, the syntax elements may be present in a loop for output layer sets (i.e., for (i=0; i<num_olss; i++)). In this respect, OperatingPointGroupBox may be different from the case of FIG. 10 in which the syntax elements ptl_idx, output_layer_set_idx and layer_count are present in a loop for operating points (i.e., for (i=0; i<num_operating_points; i++)).

Also, OperatingPointGroupBox may include syntax elements layer_id[i][j] and is_output_layer[i][j]. Here, i may be equal to or greater than 0 and less than the value of num_olss, and j may be equal to or greater than 0 and less than the value of layer_count. Semantics of the syntax elements are as described above with reference to FIG. 12. In an example, layer_id[i][j] and is_output_layer[i][j] may be present (or signaled) when ols_mode_idc is 2 or sparse_layer_id_present_flag has a second value (e.g., 1). However, embodiments of the present disclosure are not limited to the above examples. For example, layer_id[i][j] and is_output_layer[i][j] may be present when ols_mode_idc is 0 or 1, or may be present regardless of values of ols_mode_idc and sparse_layer_id_present_flag. Meanwhile, the syntax elements may be present in a loop for output layer sets (i.e., for (i=0; i<num_olss; i++)). In this respect, OperatingPointGroupBox may be different from the case of FIG. 10 in which the syntax elements layer_id and is_outputlayer are present in a loop for operating points (i.e., for (i=0; i<num_operating_points; i++)).

In addition, VvcOperatingPointsRecord may include a syntax element num_operating_points specifying the number of operating points.

In addition, VvcOperatingPointsRecord may include syntax elements ols_idx, max_temporal_id, frame_rate_info_flag, bit_rate_info_flag, avgFrameRate, constantFrameRate, maxBitRate, and avgBitRate. The semantics of the syntax elements are as described above with reference to FIG. 12.

In addition, VvcOperatingPointsRecord may include a syntax element entity_count. entity_count may indicate the number of tracks present in the operating point.

In addition, VvcOperatingPointsRecord may include a syntax element entity_idx. entity_idx may indicate an index for an entity_id list in an entity group belonging to the operating point.

As described above, according to Embodiment 2 of the present disclosure, information on the output layer set (e.g., output_layer_set_idx[i], layer_count[i], etc.) may be signaled not for each operating point but for each output layer set. Accordingly, occurrence of redundancy of the information can be prevented, and signaling efficiency can be further improved.

Hereinafter, a method of generating/receiving a media file according to an embodiment of the present disclosure will be described in detail.

Figure 14:
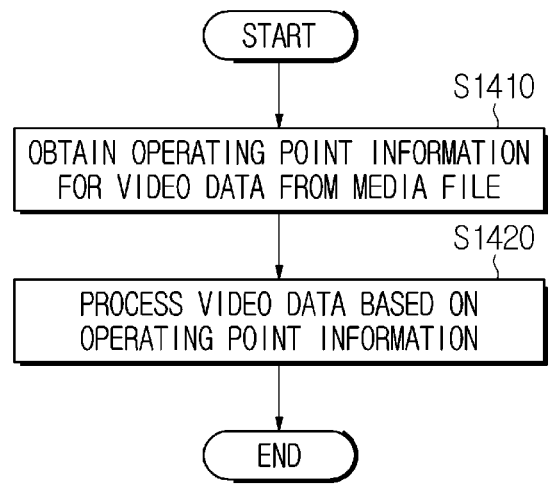
FIG. 14 is a flowchart illustrating a media file receiving method according to an embodiment of the present disclosure.

FIG. 14 is a flowchart illustrating a media file receiving method according to an embodiment of the present disclosure. Each step of FIG. 14 may be performed by a media file receiving apparatus. In one example, the media file receiving apparatus may correspond to the receiving apparatus B of FIG. 1.

Referring to FIG. 14, the media file receiving apparatus may obtain operating point information of video data from a media file received from a media file generating/transmitting apparatus (S1410). In an example, the media file may have a file format such as ISO Base Media File Format (ISO BMFF), Common Media Application Format (CMAF), or the like.

The media file receiving apparatus may process the video data based on the obtained operating point information (S1420). Here, video data processing includes a process of decapsulating a media file, a process of obtaining video data from the decapsulated media file, and a process of decoding the obtained video data according to a video codec standard, for example, a VVC standard.

In an embodiment, step S1410 may include obtaining first information (e.g., num_olss) specifying the number of output layer sets for the video data. Step S1410 may include obtaining second information (e.g., ptl_idx[i], output_layer_set_idx[i], layer_count[i], layer_id[i][j], is_output_layer[i][j], etc.) on the output layer sets based on the first information. Also, step S1410 may include obtaining third information (e.g., num_operating_points) specifying the number of operating points for the output layer sets. Also, step S1410 may include obtaining fourth information (e.g., ols_idx, max_temporal_id, etc.) on the output layer sets associated with the operating points based on the third information.

In an embodiment, the number of the second information may correspond to the number of output layer sets.

In an embodiment, the second information may include first field information (or syntax element) specifying an index of a listed PTL (profiles, tier and level) structure for each of the output layer sets. The first field information may correspond to, for example, ptl_idx described above with reference to FIGS. 12 and 13.

Also, in an embodiment, the second information may include second field information specifying an index of each of the output layer sets. The second field information may correspond to, for example, output_layer_set_idx[i] described above with reference to FIGS. 12 and 13.

Also, in an embodiment, the second information may include third field information specifying the number of layers included in each of the output layer sets. The third field information may correspond to layer_count[i] described above with reference to FIGS. 12 and 13, for example.

In addition, in an embodiment, fourth field information specifying nuh_layer_id of each layer included in each of the output layer sets may be included. The fourth field information may correspond to, for example, layer_id[i][j] described above with reference to FIGS. 12 and 13.

Also, in an embodiment, the second information may include fifth field information specifying whether each layer included in each of the output sets is an output layer. The fifth field information may correspond to, for example, is_output_layer[i][j] described above with reference to FIGS. 12 and 13.

In an embodiment, the number of the fourth information may correspond to the number of operating points.

In an embodiment, the fourth information may include sixth field information specifying an index of an output layer set associated with each of the operating points. The sixth field information may correspond to, for example, ols_idx described above with reference to FIGS. 12 and 13.

Also, in an embodiment, the fourth information may include seventh field information specifying a maximum TemporalId of network abstraction layer (NAL) units of each of the operating points. The seventh field information may correspond to, for example, max_temporal_id described above with reference to FIGS. 12 and 13.

Figure 15:
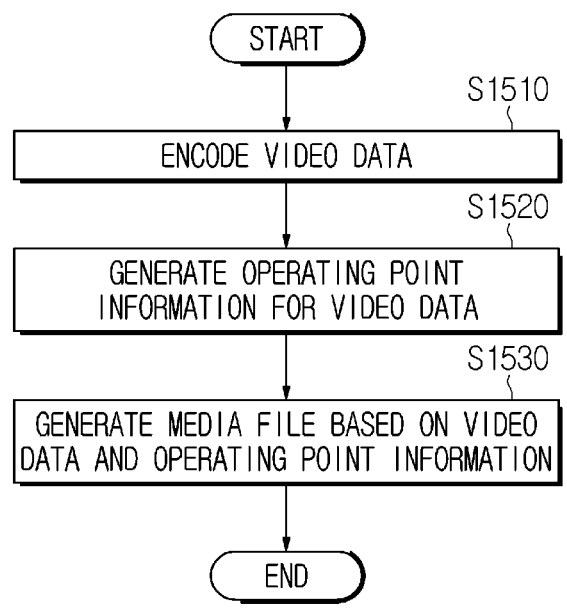
FIG. 15 is a flowchart illustrating a media file generating method according to an embodiment of the present disclosure.

FIG. 15 is a flowchart illustrating a media file generating method according to an embodiment of the present disclosure. Each step of FIG. 15 may be performed by the media file generating apparatus. In one example, the media file generating apparatus may correspond to the transmitting apparatus A of FIG. 1.

Referring to FIG. 15, the media file generating apparatus may encode video data (S1510). In an example, the video data may be encoded through a prediction, transform, and quantization process according to a video codec standard, for example, a VVC standard.

The media file generating apparatus may generate operating point information of the encoded video data (S1520). In an example, the operating point information may be configured in the VvcOperatingPointsRecord syntax structure described above with reference to FIG. 12. In addition, the operating point information may be configured in the OperatingPointGroupBox syntax structure described above with reference to FIG. 13.

The media file generating apparatus may generate a media file based on the encoded video data and the operating point information (S1530). In an example, the media file may have a file format such as ISO Base Media File Format (ISO BMFF), Common Media Application Format (CMAF), or the like.

In an embodiment, step S1520 may include generating first information specifying the number of output layer sets for the encoded video data. Also, step S1520 may include generating second information on the output layer sets based on the first information. Also, step S1520 may include generating third information specifying the number of operating points for the output layer sets. Also, step S1520 may include generating fourth information on output layer sets associated with the operating points based on the third information.

In an embodiment, the number of the second information may correspond to the number of output layer sets (e.g., num_olss). In this case, the second information may include at least one of first to fifth field information. Details of the first to fifth field information are as described above with reference to FIG. 14.

In an embodiment, the number of the fourth information may correspond to the number of operating points (e.g., num_operating_points). In this case, the fourth information may include at least one of sixth or seventh field information. Details of the sixth and seventh field information were described above with reference to FIG. 14.

The generated media file may be transmitted to a media file receiving apparatus through a recording medium or a network.

As described above, according to an embodiment of the present disclosure, information on the output layer set may be signaled for each output layer set instead of being signaled for each operating point. That is, the number of information on the output layer sets may correspond to the number of output layer sets. Accordingly, it is possible to prevent redundancy of the information, which may occur when each output layer set includes a plurality of operating points, and to further improve signaling efficiency.

Figure 16:
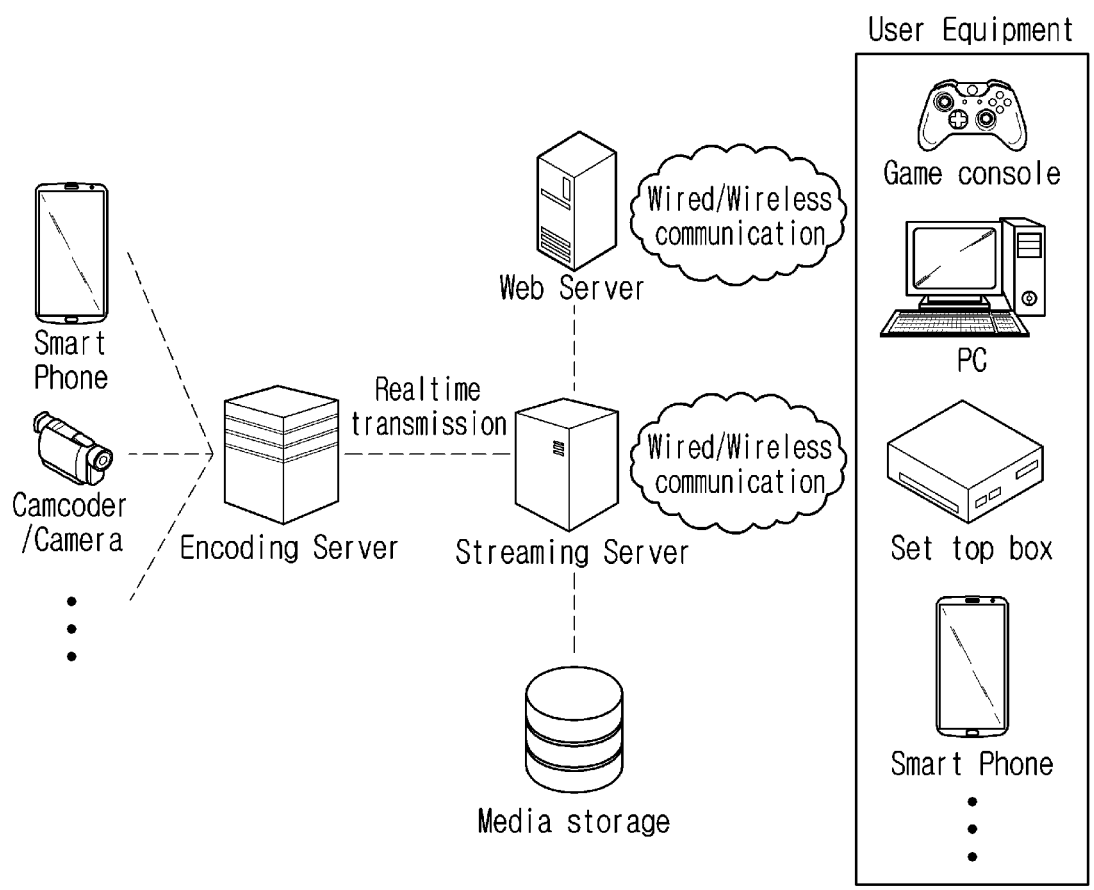
FIG. 16 is a view showing a content streaming system, to which an embodiment of the present disclosure is applicable.

FIG. 16 is a view showing a content streaming system, to which an embodiment of the present disclosure is applicable.

As shown in FIG. 16, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to generate and transmit/receive a media file.

What is claimed is:

1. A media file receiving method performed by a media file receiving apparatus for receiving a media file of a predetermined format including video data, the method comprising:
   obtaining operating point information of video data from a media file; and
   processing the video data based on the obtained operating point information,
   wherein the obtaining the operating point information comprises:
   obtaining first information specifying a number of output layer sets for the video data;
   obtaining second information on the output layer sets based on the first information;
   obtaining third information specifying a number of operating points for the output layer sets; and
   obtaining fourth information on output layer sets associated with the operating points based on the third information.

2. The method of claim 1, wherein a number of the second information corresponds to the number of output layer sets.

3. The method of claim 1, wherein the second information comprises first field information specifying an index of a listed profiles, tier and level (PTL) structure for each of the output layer sets.

4. The method of claim 1, wherein the second information comprises second field information specifying an index of each of the output layer sets.

5. The method of claim 1, wherein the second information comprises third field information specifying a number of layers included in each of the output layer sets.

6. The method of claim 1, wherein the second information comprises fourth field information specifying nuh_layer_id of each layer included in each of the output layer sets.

7. The method of claim 1, wherein the second information comprises fifth field information specifying whether each layer included in each of the output layer sets is an output layer.

8. The method of claim 1, wherein a number of the fourth information corresponds to the number of operating points.

9. The method of claim 1, wherein the fourth information comprises sixth field information specifying an index of an output layer set associated with each of the operating points.

10. The method of claim 1, wherein the fourth information comprises seventh field information specifying a maximum TemporalId of network abstraction layer (NAL) units of each of the operating points.

11. A media file receiving apparatus comprising a memory and at least one processor, the at least one processor configured to:
   obtain operating point information of video data from a media file; and
   process the video data based on the obtained operating point information,
   wherein the operating point information is obtained by:
   obtaining first information specifying a number of output layer sets for the video data;
   obtaining second information on the output layer sets based on the first information;
   obtaining third information specifying a number of operating points for the output layer sets; and
   obtaining fourth information on output layer sets associated with the operating points based on the third information.

12. A media file generating method performed by a media file generating apparatus for generating a media file of a predetermined format including video data, the method comprising:
   encoding video data;
   generating operating point information for the encoded video data; and
   generating a media file based on the encoded video data and the generated operating point information,
   wherein the generating the operating point information comprises:
   generating first information specifying a number of output layer sets for the encoded video data;
   generating second information on the output layer sets based on the first information;
   generating third information specifying a number of operating points for the output layer sets; and generating fourth information on output layer sets associated with the operating points based on the third information.

13. The method of claim 12, wherein a number of the second information corresponds to the number of output layer sets.

14. The method of claim 12, wherein a number of the fourth information corresponds to the number of operating points.

15. A method of transmitting a media file generated by the media file generating method of claim 12.

16. A media file generating apparatus comprising a memory and at least one processor, the at least one processor configured to:
   encode video data;
   generate operating point information for the encoded video data; and
   generate a media file based on the encoded video data and the generated operating point information,
   wherein the operating point information is generated by:
   generating first information specifying a number of output layer sets for the encoded video data;
   generating second information on the output layer sets based on the first information;
   generating third information specifying a number of operating points for the output layer sets; and
   generating fourth information on output layer sets associated with the operating points based on the third information.

* * * * *